United States Patent
Cao et al.

(10) Patent No.: US 12,451,193 B2
(45) Date of Patent: Oct. 21, 2025

(54) MEMORY SYSTEM, MEMORY AND MEMORY CONTROL METHOD

(71) Applicant: Yangtze Memory Technologies Co., Ltd., Hubei (CN)

(72) Inventors: Yi Cao, Hubei (CN); Ke Liang, Hubei (CN); Liang Qiao, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 239 days.

(21) Appl. No.: 18/330,120

(22) Filed: Jun. 6, 2023

(65) Prior Publication Data

US 2024/0221842 A1 Jul. 4, 2024

Related U.S. Application Data

(60) Provisional application No. 63/477,882, filed on Dec. 30, 2022.

(30) Foreign Application Priority Data

May 23, 2023 (CN) .......................... 202310587250.9

(51) Int. Cl.
*G11C 16/20* (2006.01)
*G11C 16/04* (2006.01)
*G11C 16/24* (2006.01)

(52) U.S. Cl.
CPC .......... *G11C 16/24* (2013.01); *G11C 16/0483* (2013.01)

(58) Field of Classification Search
CPC .......................... G11C 29/028; G11C 16/3459
See application file for complete search history.

(56) References Cited

U.S. PATENT DOCUMENTS

2012/0275222 A1* 11/2012 Choi ....................... G11C 29/52
  365/185.09
2022/0262411 A1* 8/2022 Chai ....................... G11C 7/12

* cited by examiner

*Primary Examiner* — Uyen Smet
(74) *Attorney, Agent, or Firm* — HANLEY, FLIGHT & ZIMMERMAN, LLC

(57) ABSTRACT

Devices, systems, and methods for counting a quantity of fail-bits in a memory device using a VFC circuit are disclosed. The VFC circuit can be calibrated via an offset adjustment mechanism to compensate an internal mismatch. The VFC circuit can include a processing unit and a circuit coupled to the processing unit. The processing unit can receive a first signal representing a number of detected fail-bits in the memory array, process the first signal and an offset signal, and generate a second signal representing a quantity of fail-bits. The circuit can receive the first and second signals, determine a difference between the quantity of fail-bits represented by the second signal and the number of detected fail-bits represented by the first signal, adjust the offset signal according to the difference, and provide the offset signal to the processing unit.

20 Claims, 11 Drawing Sheets

MEMORY SYSTEM, MEMORY AND MEMORY CONTROL METHOD

CROSS-REFERENCE TO RELATED APPLICATIONS

This application claims benefit to U.S. Provisional Patent Application No. 63/477,882, filed on Dec. 30, 2022, the entire contents of which is incorporated herein by reference.

TECHNICAL FIELD

The present disclosure generally relates to the field of semiconductor technology, and more particularly, to device, system, and method of improving a performance of a verify fail-bit count circuit in a 3D NAND memory.

BACKGROUND

In the process of programming a memory device, memory cells of the memory device can be verified as being properly programmed or not. Memory cells fail to be programmed properly are referred to as 'fail-bits', and the quantity of fail-bits in a memory device is an important measure about the quality and performance of the memory device. The circuit in the memory device performing the function of counting the quantity of fail-bits is accordingly called a verify fail-bit count (VFC) circuit, also referred to as a fail-bit counter.

BRIEF SUMMARY

Embodiments of devices, systems, and methods for counting a quantity of fail-bits in a memory device are described in the present disclosure using a VFC circuit.

In some embodiments, a memory device can include a memory array and a peripheral circuit. The peripheral circuit can include a page buffer coupled to the memory array, a VFC circuit coupled to the page buffer, and a control circuit coupled to the VFC circuit. The page buffer can be configured to detect fail-bits in the memory array. The VFC circuit can be configured to generate an offset signal to compensate a mismatch in the VFC circuit, such that the VFC circuit outputs a quantity of the fail-bits in the memory array. The control circuit can be configured to control an adjustment of the offset signal.

In some embodiments, the VFC circuit can further be configured to adjust the offset signal according to the mismatch.

In some embodiments, the VFC circuit can include a comparator unit configured to determine the mismatch.

In some embodiments, the VFC circuit can further include a trimming unit coupled to the comparator unit and configured to provide the offset signal according to the mismatch.

In some embodiments, the VFC circuit can further include a processing unit coupled to the trimming unit and the comparator unit and configured to output the quantity of the fail-bits by combining the offset signal and an input signal representing the detected fail-bits.

In some embodiments, the input signal can include a plurality of current signals, each representing a detection of a fail-bit.

In some embodiments, the processing unit can further be configured to output a voltage signal having an amplitude proportional to the quantity of the fail-bits.

In some embodiments, the control circuit can further be configured to provide a calibration signal, and the comparator unit is further configured to determine the mismatch by comparing the calibration signal and an output signal of the processing unit. In some embodiments, the trimming unit can further be configured to decrease the offset signal if the mismatch is positive and increase the offset signal if the difference is negative.

In some embodiments, the offset signal can be decreased or interested by a constant value corresponding to changing the quantity of the fail-bits by 1.

In some embodiments, a memory system can include a memory controller and one or more memory devices controlled by the memory controller. Each of the one or more memory devices can include a memory array and a peripheral circuit. The peripheral circuit can include a page buffer coupled to the memory array, a VFC circuit coupled to the page buffer, and a control circuit coupled to the VFC circuit. The page buffer can be configured to detect fail-bits in the memory array. The VFC circuit can be configured to generate an offset signal to compensate a mismatch in the VFC circuit, such that the VFC circuit outputs a quantity of the fail-bits in the memory array. The control circuit can be configured to control an adjustment of the offset signal.

In some embodiments, the VFC circuit can further be configured to adjust the offset signal according to the mismatch.

In some embodiments, the VFC circuit can include a comparator unit configured to determine the mismatch.

In some embodiments, the VFC circuit can further include a trimming unit coupled to the comparator unit and configured to provide the offset signal according to the mismatch.

In some embodiments, the VFC circuit can further include a processing unit coupled to the trimming unit and the comparator unit and configured to output the quantity of the fail-bits by combining the offset signal and an input signal representing the detected fail-bits.

In some embodiments, the input signal can include a plurality of current signals, each representing a detection of a fail-bit.

In some embodiments, the processing unit can further be configured to output a voltage signal having an amplitude proportional to the quantity of the fail-bits.

In some embodiments, the control circuit can further be configured to provide a calibration signal, and the comparator unit is further configured to determine the mismatch by comparing the calibration signal and an output signal of the processing unit.

In some embodiments, the trimming unit can further be configured to decrease the offset signal if the mismatch is positive and increase the offset signal if the difference is negative.

In some embodiments, the offset signal can be decreased or interested by a constant value corresponding to changing the quantity of the fail-bits by 1.

In some embodiments, a method can include detecting fail-bits in a memory array of a memory device by a page buffer coupled to the memory array, generating an offset signal by a VFC circuit coupled to the page buffer to compensate a mismatch in the VFC circuit, adjusting the offset signal according to the mismatch under the control of a control circuit coupled to the VFC circuit, and providing a quantity of the fail-bits of the memory array by the VFC circuit.

In some embodiments, adjusting the offset signal can include adjusting the offset signal by the VFC circuit.

In some embodiments, the method can further include determining the mismatch by a comparator unit of the VFC circuit.

In some embodiments, generating the offset signal can include providing the offset signal by a trimming unit of the VFC circuit.

In some embodiments, the method can further include receiving, by the VFC circuit, an input signal comprising a plurality of current signals, each representing a detection of a fail-bit.

In some embodiments, the method can further include combining the offset signal and the input signal by a processing unit of the VFC circuit to provide an output signal representing the quantity of the fail-bits.

In some embodiments, providing the quantity of the fail-bits can include providing a voltage signal having an amplitude proportional to the quantity of the fail-bits.

In some embodiments, the method can further include receiving a calibration signal by the VFC circuit, and comparing the calibration signal and the output signal to determine the mismatch.

In some embodiments, adjusting the offset signal can include increasing the offset signal by a constant value if the mismatch is negative, and decreasing the offset signal by the constant value if the mismatch is positive.

In some embodiments, the constant value can correspond to changing the quantity of fail-bits by 1.

In some embodiments, the method can further include comparing the quantity of fail-bits and a baseline quantity corresponding to a quality standard.

In some embodiments, a device for counting a quantity of fail-bits in a memory array can include a processing unit and a circuit coupled to the processing unit. The processing unit can receive a first signal representing a number of detected fail-bits in the memory array, process the first signal and an offset signal, and generate a second signal representing a quantity of fail-bits. The circuit can receive the first and second signals, determine a difference between the quantity of fail-bits represented by the second signal and the number of detected fail-bits represented by the first signal, adjust the offset signal according to the difference, and provide the offset signal to the processing unit.

In some embodiments, the circuit can include a switch, a comparator unit, and a trimming unit coupled each other. The switch can control an operational state of a calibration mode of the device. When the calibration mode is on, the comparator unit can determine the difference between the quantity of fail-bits and the number of detected fail-bits, and the trimming unit can adjust the offset signal according to the difference.

In some embodiments, when the calibration mode is on, the trimming unit can decrease an amplitude of the offset value by a constant value if the difference is positive, increase the amplitude of the offset value by the constant value if the difference is negative, and switch off the calibration mode if the difference equals 0. The constant value can correspond to changing the quantity of fail-bits by 1.

In some embodiments, the first signal can include a plurality of current signals, each representing a detection of a fail-bit. In some embodiments, the second signal can include a voltage signal. In some embodiments, the voltage signal can be proportional to the quantity of fail-bits.

In some embodiments, a memory system can include a memory array, a page buffer coupled to the memory array, a VFC circuit coupled to the page buffer, and a control circuit coupled to the page buffer and the VFC circuit. The page buffer can provide a first signal corresponding to a number of detected fail-bits in the memory array. The control circuit can provide a calibration signal corresponding to a calibration number. The VFC circuit can be switched on/off a calibration mode by the control circuit. When the calibration mode is off, the VFC circuit can receive the first signal and process the first signal together with an offset signal to generate a second signal corresponding to a quantity of fail-bits in the memory array. When the calibration mode is on, the VFC circuit can receive the calibration signal, process the calibration signal and the offset signal and generate the second signal, and adjust the offset signal to eliminate a difference between the quantity of fail-bits and the calibration number.

In some embodiments, the VFC circuit can include a switch, a comparator unit, and a trimming unit coupled each other. The switch can control an operational state of the calibration mode. When the calibration mode is on, the comparator unit can receive the calibration signal and the second signal and determine the difference between the quantity of fail-bits and the number of detected fail-bits, and the trimming unit can adjust the offset signal according to the difference.

In some embodiments, when the calibration mode is on, the trimming unit can decrease an amplitude of the offset value by a constant value if the difference is positive, increase the amplitude of the offset value by the constant value if the difference is negative, and turn off the calibration mode if the difference equals 0. The constant value can correspond to changing the quantity of fail-bits by 1.

In some embodiments, the first signal can include a plurality of current signals, each representing a detection of a fail-bit. In some embodiments, the second signal can include a voltage signal. In some embodiments, the voltage signal can be proportional to the quantity of fail-bits.

In some embodiments, a method can include turning on a calibration mode of a VFC circuit of a memory device, providing the VFC circuit a calibration signal corresponding to a calibration number, processing the calibration signal and an offset signal by the VFC circuit to generate an output signal corresponding to a quantity of fail-bits in the memory array, adjusting the offset signal to eliminate a difference between the quantity of fail-bits and the calibration number, and turning off the calibration mode of the VFC circuit.

In some embodiments, adjusting the offset signal can include changing an amplitude of the offset signal by a constant value. The constant value can correspond to changing the quantity of fail-bits by 1.

In some embodiments, changing the amplitude of the offset signal can include (a) comparing the quantity of fail-bits and the calibration number, (b) increasing the amplitude of the offset signal by the constant value, if the difference between the quantity of fail-bits and the calibration number is negative, (c) decreasing the amplitude of the offset signal by the constant value, if the difference between the quantity of fail-bits and the calibration number is positive, and (d) repeating (a)-(c) until the quantity of fail-bits and the calibration number are the same.

In some embodiments, the calibration signal can include a plurality of current signals. In some embodiments, the output signal comprises a voltage signal. In some embodiments, the output signal has an amplitude proportional to the quantity of fail-bits in the memory array.

In some embodiments, the method can further include counting the quantity of fail-bits in the memory array using the VFC circuit. In some embodiments, the method can further include comparing the quantity of fail-bits counted by the VFC circuit and a baseline quantity. The baseline quantity can correspond to a quality standard.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
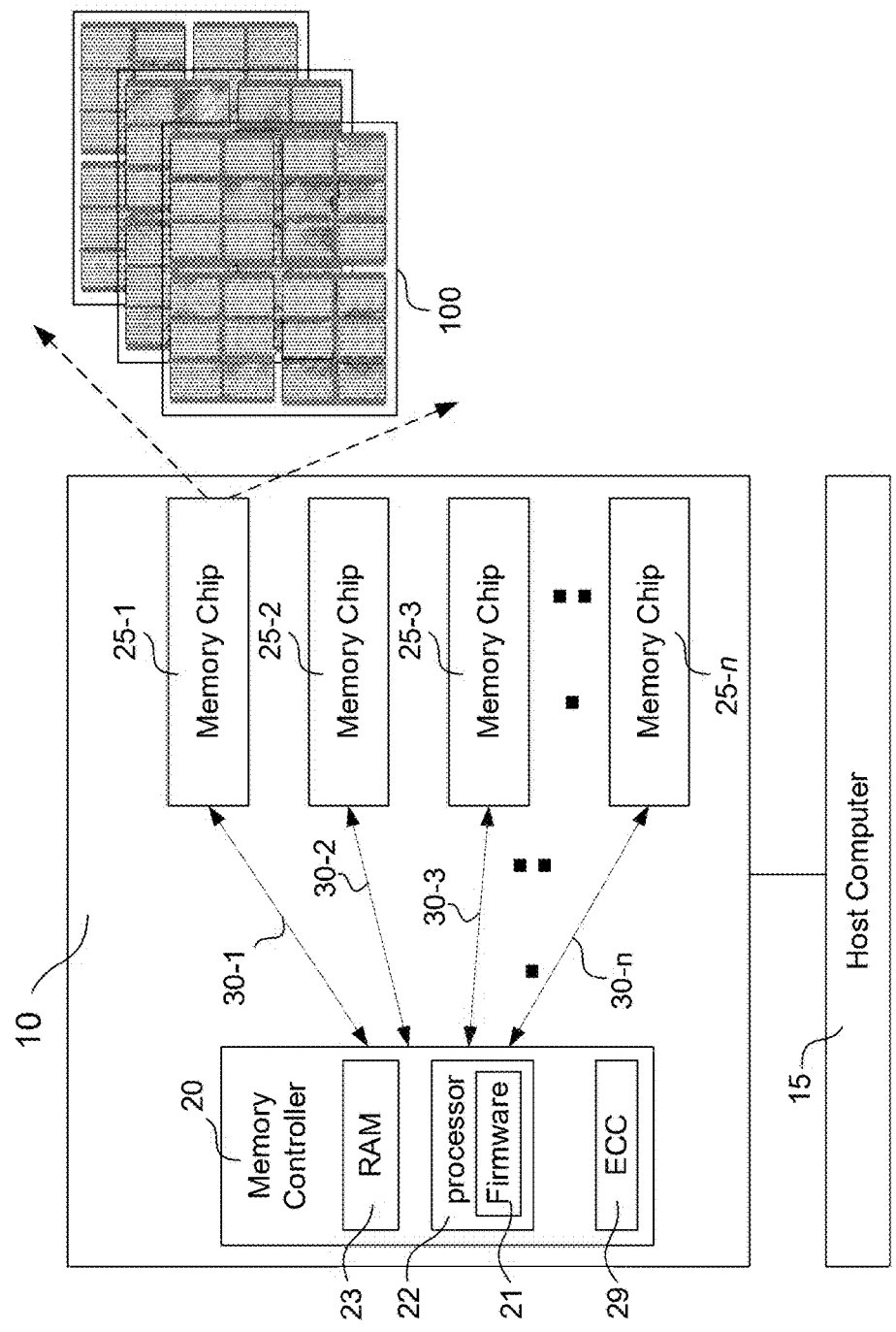
FIGS. 1 and 2A-2B illustrate a storage system with one or more memory devices, according to some embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure, or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context. It should be readily understood that the meaning of "on," "above," and "over" in the present disclosure should be interpreted in the broadest manner such that "on" not only means "directly on" something, but also includes the meaning of "on" something with an intermediate feature or a layer there between. Moreover, "above" or "over" not only means "above" or "over" something, but can also include the meaning it is "above" or "over" something with no intermediate feature or layer there between (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

As used herein, the term "substrate" refers to a material onto which subsequent material layers are added. The substrate includes a "top" surface and a "bottom" surface. The top surface of the substrate is typically where a semiconductor device is formed, and therefore the semiconductor device is formed at a top side of the substrate unless stated otherwise. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, there above, and/or there below. A layer can include multiple layers. For example, an interconnect layer can include one or more conductive and contact layers (in which contacts, interconnect lines, and/or vertical interconnect accesses (VIAs) are formed) and one or more dielectric layers.

In the present disclosure, for ease of description, "tier" is used to refer to elements of substantially the same height along the vertical direction. For example, a word line and the underlying gate dielectric layer can be referred to as "a tier," a word line and the underlying insulating layer can together be referred to as "a tier," word lines of substantially the same height can be referred to as "a tier of word lines" or similar, and so on.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the terms "about" or "approximately" indicate the value of a given quantity that can vary based on a particular technology node associated with the subject semiconductor device. Based on the particular technology node, the terms "about" or "approximately" can indicate a value of a given quantity that varies within, for example, 10-30% of the value (e.g., ±10%, ±20%, or ±30% of the value).

In the present disclosure, the term "horizontal/horizontally/lateral/laterally" means nominally parallel to a lateral surface of a substrate, and the term "vertical" or "vertically" means nominally perpendicular to the lateral surface of a substrate.

As used herein, the term "3D memory" refers to a three-dimensional (3D) semiconductor device with vertically oriented strings of memory cell transistors (referred to herein as "memory strings," such as NAND strings) on a laterally-oriented substrate so that the memory strings extend in the vertical direction with respect to the substrate.

FIG. 1 illustrates a block diagram of a system S1 having a storage system 10, according to some embodiments. In some embodiments, system S1 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. Storage system 10 (e.g., a NAND storage system) can include a memory controller 20 and one or more semiconductor memory chips 25-1, 25-2, 25-3, . . . , 25-*n*. Each semiconductor memory device 25 (hereafter just "memory device") can be a NAND chip (e.g., "flash," "NAND flash" or "NAND"). Storage system 10 can communicate with a host 15 through memory controller 20, where memory controller 20 can be connected to one or more memory devices 25-1, 25-2, 25-3, . . . , 25-*n*, via one or more memory channels 30-1, 30-2, 30-3, . . . , 30-*n*. In some embodiments, each memory device 25 can be managed by memory controller 20 via one or more memory channels 30-1, 30-2, 30-3, . . . , 30-*n*.

In some embodiments, host 15 can include a processor of an electronic device, such as a central processing unit (CPU), or a system-on-chip (SoC), such as an application processor (AP). Host 15 can send data to be stored at storage system 10 and/or can retrieve data from stored in storage system 10.

In some embodiments, memory controller 20 can handle I/O requests received from host 15, ensure data integrity and efficient storage, and manage memory device 25. To perform these tasks, memory controller 20 can run firmware 21, which can be executed by one or more processors 22 (e.g., micro-controller units, CPU) of memory controller 20. For example, memory controller 20 can run firmware 21 to map logical addresses (e.g., address utilized by the host associated with host data) to physical addresses in memory device 25 (e.g., actual locations where the data is stored). Memory controller 20 also runs firmware 21 to manage defective memory blocks in the memory device 25, where the firmware 21 can remap the logical address to a different physical address, i.e., move the data to a different physical address. Memory controller 20 can also include one or more memories 23 (e.g., DRAM, SRAM, EPROM, etc.), which can be used to store various metadata used by the firmware 21. In some embodiments, memory controller 20 can also perform error recovery through an error correction code (ECC) engine 29. ECC is used to detect and correct the raw bit errors that occur within each memory device 25.

In some embodiments, memory channels 30 can provide data and control communication between memory controller 20 and each memory device 25 via a data bus. Memory controller 20 can select one of memory devices 25 according to an enable signal.

In some embodiments, each memory device 25 in FIG. 1 can include one or more memory dies 100, where each memory die can be a 3D NAND memory.

Figure 2A:
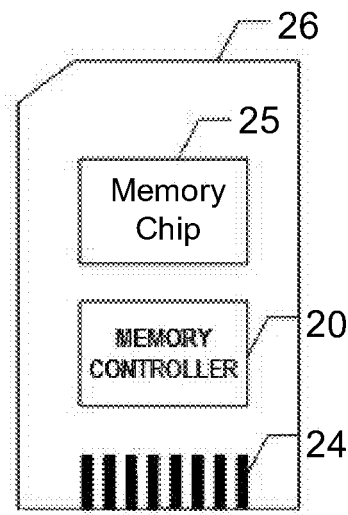
Figure 2B:
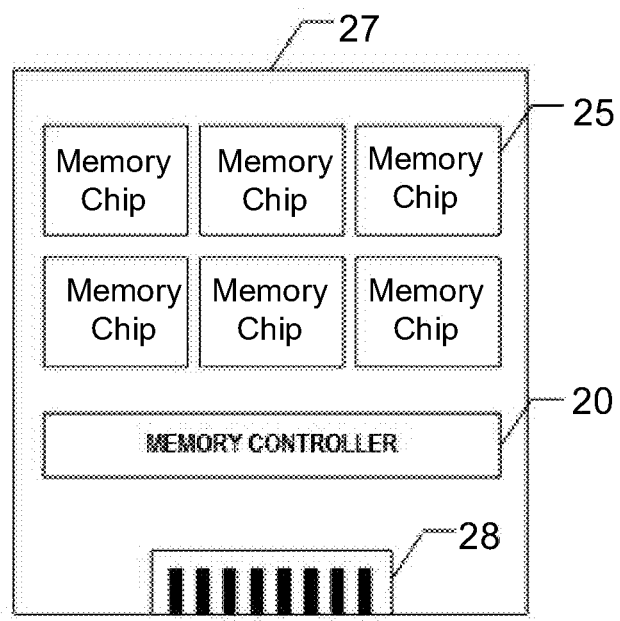

In some embodiments, memory controller 20 and one or more memory device 25 can be integrated into various types of storage devices, for example, be included in the same package, such as a universal Flash storage (UFS) package or an eMMC package. That is, storage system 10 can be implemented and packaged into different types of end electronic products. In one example as shown in FIG. 2A, memory controller 20 and a single memory device 25 can be integrated into a memory card 26. Memory card 26 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 26 can further include a memory card connector 24 coupling memory card 26 with a host (e.g., host 15 in FIG. 1). In another example as shown in FIG. 2B, memory controller 20 and multiple memory devices 25 can be integrated into a solid state drive (SSD) 27. SSD 27 can further include an SSD connector 28 coupling SSD 27 with a host (e.g., host 15 in FIG. 1).

Figure 3:
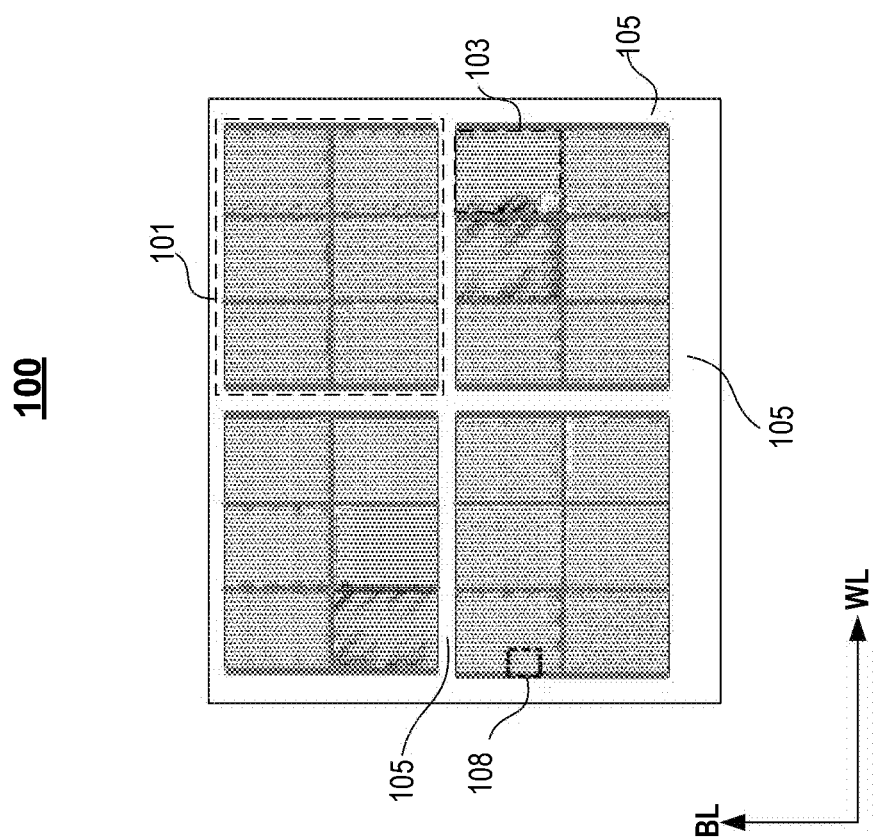
FIG. 3 illustrates a schematic diagram of a memory die, according to some embodiments.

FIG. 3 illustrates a top-down view of a memory die 100, according to some embodiments. The example configuration shown in FIG. 3 is given as a non-limiting example and it is to be appreciated that memory is scalable. In some embodiments, memory die 100 can include one or more memory arrays 101, each of which can include a plurality of memory blocks 103. Identical and concurrent operations can take place at each memory arrays 101. Memory block 103, which can be megabytes (MB) in size, is the smallest size to carry out erase operations. Memory die 100 can include, for example, four memory arrays 101. Each memory array 101 can include, for example, six memory blocks 103. Each memory block 103 can include a plurality of memory cells, where each memory cell can be addressed through interconnections such as bit lines and word lines. The bit lines and word lines can be laid out perpendicularly (e.g., in rows and columns, respectively), forming an array of metal lines. The direction of bit lines and word lines are labeled as "BL" and "WL" in FIG. 3.

In some embodiments, memory die 100 can also include a periphery region 105, an area surrounding memory arrays 101. The periphery region 105 can include many digital, analog, and/or mixed-signal circuits to support functions of the memory array, for example, page buffers, row and column decoders and sense amplifiers. Peripheral circuits use active and/or passive semiconductor devices, such as transistors, diodes, capacitors, resistors, etc., as would be apparent to a person of ordinary skill in the art.

In some embodiments, the arrangement of the memory arrays 101 in the memory die 100 and the arrangement of the memory blocks 103 in each memory arrays 101 illustrated in FIG. 3 are only used as an example, which does not limit the scope of the present disclosure.

Figure 4:
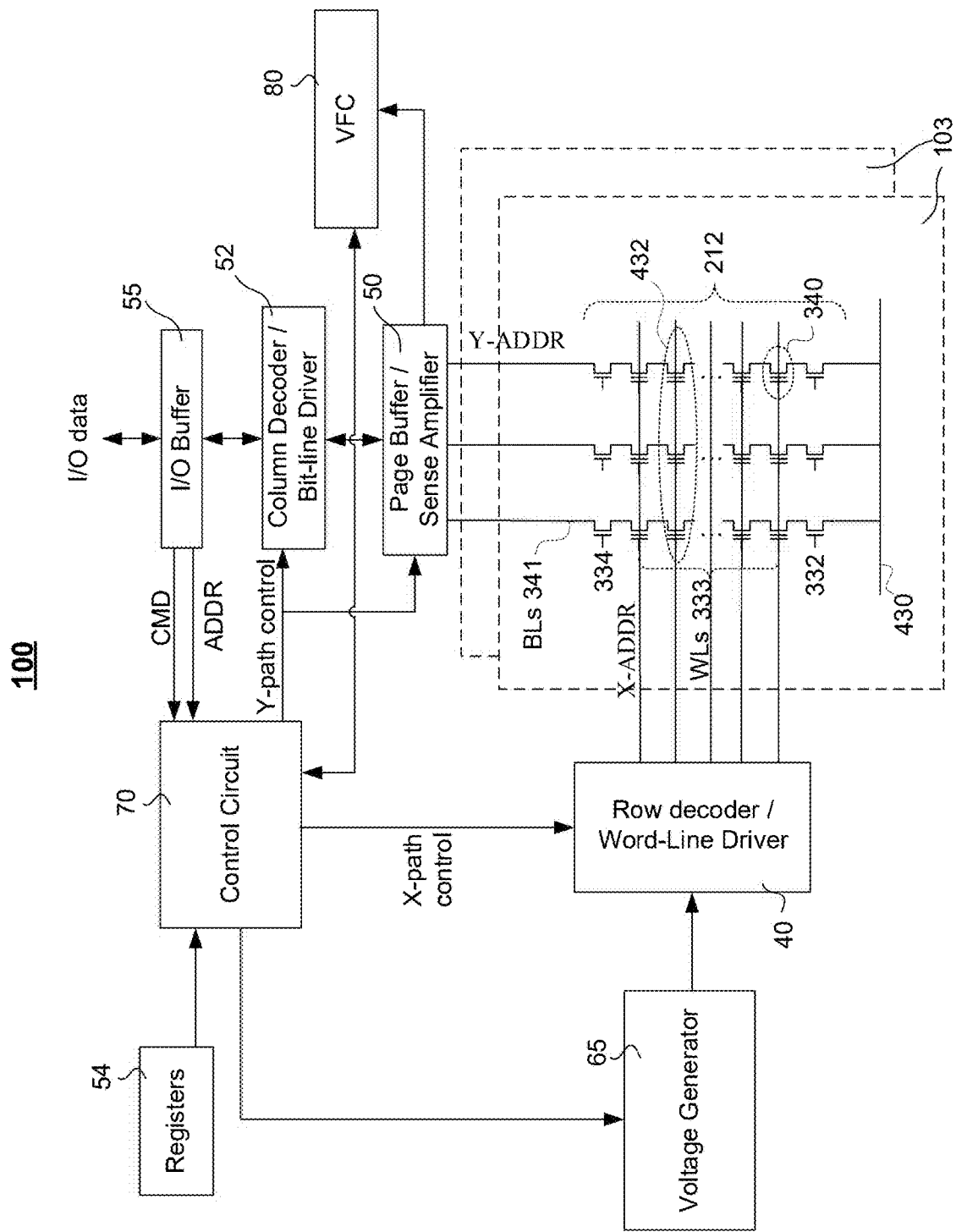
FIG. 4 illustrates a schematic of a three-dimensional (3D) memory die, according to some embodiments.

FIG. 4 illustrates a schematic diagram of the memory die 100, according to some embodiments. In some embodiments, memory die 100 can include one or more memory blocks 103 (e.g., 103-1, 103-2, 103-3). Each memory block 103 can include a plurality of memory strings 212. Each memory string 212 includes a plurality of memory cells 340. Memory cells 340 coupled to a same word line forms a memory page 432. Memory string 212 can also include at least one field effect transistor (e.g., MOSFET) at each end, which is controlled by a lower select gate ("LSG") 332 and a top select gate ("TSG") 334, respectively. Lower select gates ("LSGs") can also be referred to as bottom select gates ("BSGs"). The drain terminal of the top select transistor 334-T can be connected to a bit line 341, and the source terminal of the lower select transistor 332-T can be connected to an array common source ("ACS") 430. ACS 430 can be shared by the memory strings 212 in an entire memory block, and is also referred to as the common source line.

In some embodiments, memory die 100 can also include a periphery circuit that can include many digital, analog, and/or mixed-signal circuits to support functions of the memory block 103, for example, a page buffer/sense amplifier 50, a row decoder/word line driver 40, a column decoder/bit line driver 52, a control circuit 70, registers 54, a VFC circuit 80, a voltage generator 65 and an input/output buffer 55. These circuits can include active and/or passive semiconductor devices, such as transistors, diodes, capacitors, resistors, etc., as would be apparent to a person of ordinary skill in the art.

In some embodiments, memory blocks 103 can be coupled with the row decoder/word line driver 40 via word lines ("WLs") 333, lower select gates ("LSGs") 332 and top select gates ("TSGs") 334. Memory blocks 103 can be coupled with page buffer/sense amplifier 50 via bit lines ("BLs") 341. Page buffer/sense amplifier 50 can be coupled to VFC circuit 80 and control circuit 70. Row decoder/word line driver 40 can select one of the memory blocks 103 on the memory die 100 in response to an X-path control signal provided by the control circuit 70. Row decoder/word line driver 40 can transfer voltages provided from the voltage generator 65 to the word lines according to the X-path control signal. During the read and program operation, the row decoder/word line driver 40 can transfer a read voltage $V_{read}$ and a program voltage $V_{pgm}$ to a selected word line and a pass voltage $V_{pass}$ to an unselected word line according to the X-path control signal received from control circuit 70.

In some embodiments, column decoder/bit line driver 52 can transfer an inhibit voltage $V_{inhibit}$ to an unselected bit line and connect a selected bit line to ground according to a Y-path control signal received from control circuit 70. In the other words, column decoder/bit line driver 52 can be configured to select or unselect one or more memory strings 212 according to the Y-path control signal from control circuit 70. Page buffer/sense amplifier 50 can be configured to read and program (write) data from and to memory block 103 according to the control signal Y-path control from control circuit 70. For example, page buffer/sense amplifier 50 can store one page of data to be programmed into one memory page 432. In another example, during a read operation, page buffer/sense amplifier 50 can sense current flowing through bit line 341 that reflects the logic state (i.e., data) of memory cell 340 and amplify small signal to a measurable magnification. In another example, page buffer/sense amplifier 50 can perform verify operations to ensure that the data have been properly programmed into each memory cell 340.

In some embodiments, if page buffer/sense amplifier 50 detects, via the verify operations, that one or more memory cells are not properly programmed, page buffer/sense amplifier 50 can send signals representing detections of fail-bits to VFC circuit 80. VFC circuit 80, after receiving these signals, processes them to count a quantity of fail-bits in memory blocks 103. VFC circuit 80 can communicate with control circuit 70. For example, VFC circuit 80 can receive control commands from control circuit 70 and/or provide control circuit 70 an output signal representing the quantity of fail-bits detected in memory blocks 103. It is noted that the arrangement of the VFC circuit 80 in FIG. 4 is shown as non-limiting examples. In some embodiments, VFC circuit 80 can be incorporated in control circuit 70.

In some embodiments, column decoder/bit line driver 52 can transfer a bias voltage with an amplitude $V_{bias}$ to a selected bit line according to a Y-path control signal from control circuit 70 and the data to be programmed from page buffer/sense amplifier 50.

In some embodiments, input/output buffer 55 can transfer the I/O data from/to page buffer/sense amplifier 50 as well as addresses ADDR or commands CMD to control circuit 70. In some embodiments, input/output buffer 55 can function as an interface between memory controller 20 (in FIG. 1) and memory die 100 on memory device 25.

In some embodiments, control circuit 70 can control page buffer/sense amplifier 50 and row decoder/word line driver 40 in response to the commands CMD transferred by input/output buffer 55. During the program operation, control circuit 70 can control row decoder/word line driver 40, bit line driver 52, and page buffer/sense amplifier 50 to program a selected memory cell. During the read operation, control circuit 70 can control row decoder/word line driver 40 and page buffer/sense amplifier 50 to read a selected memory cell. The X-path control signal and the Y-path control signal include a row address X-ADDR and a column address Y-ADDR that can be used to locate the selected memory cell in the memory block 103. The row address X-ADDR can include a page index PD, a block index BD and an array index AL to identify memory page 432, memory block 103, and memory array 101 (in FIG. 3), respectively. The column address Y-ADDR can identify a byte or a word in the data of memory page 432.

In some embodiments, voltage generator 65 can generate voltages to be supplied to word lines and bit lines under the control of control circuit 70. The voltages generated by voltage generator 65 include the read voltage $V_{read}$, the program voltage $V_{pgm}$, the pass voltage $V_{pass}$, the inhibit voltage $V_{inhibit}$, the bit line bias voltage $V_{bias}$, etc.

It is noted that the arrangement of the electronic components in the storage system 10 and the memory die 100 in FIGS. 1, 2A-2B, and 3-4 are shown as non-limiting examples. In some embodiments, storage system 10 and memory die 100 can have other layout and can include additional components. Components (e.g., control circuit 70, I/O buffer 55) on memory die 100 shown in FIG. 4 can also be moved off memory die 100, as a stand-alone electric component in the storage system 10. Components (e.g., control circuit 70, I/O buffer 55) on memory die 100 shown in FIG. 4 can also be moved to other components in storage system 10, for example, a portion of control circuit 70 can be combined with memory controller 20 and vice versa.

In FIG. 4, page buffer 50 can be any page buffer disclosed in the present disclosure, and it can be configured to read and program (write) data from and to memory cell array 103 according to the control signals from control circuit 70. In one example, page buffer 50 may store one or more pages of program data (write data) to be programmed into a target row of memory cell array 103. In another example, page buffer 50 may verify programmed target memory cells 340 in each program/verify loop (cycle) in a program operation to ensure that the data has been properly programmed into memory cells 340 coupled to selected word lines 333. In still another example, Page buffer 50 may also sense the low power signals from bit line 341 that represents a data bit stored in memory cell 340 and amplify the small voltage swing to recognizable logic levels in a read operation.

In program operations, page buffer 50 can include storage modules (e.g., latches) for temporarily storing a piece of N-bits data (e.g., in the form of gray codes) received from I/O buffer 55 and providing the piece of N-bits data to a corresponding target memory cell 340 through the corresponding bit line 341. In a read operation, age buffer 50 can be configured to read one or more (M) bits of the piece of N-bits data.

Column decoder/bit line driver 52 can be configured to be controlled by control circuit 70 and select one or more NAND memory strings 212 by applying bit line voltages generated from voltage generator 65. Row decoder/word line driver 40 can be configured to be controlled by control circuit 70 and select/deselect blocks of memory cell array 103 and select/deselect word lines 333. Row decoder/word line driver 40 can be further configured to drive word lines 333 using word line voltages generated from voltage generator 65.

As part of peripheral circuits, control circuit 70 can be coupled to other peripheral circuits described above and configured to control the operations of other peripheral circuits. Registers 54 can be coupled to control circuit 70 and include status registers, command registers, and address registers for storing status information, command operation codes (OP codes), and command addresses for controlling the operations of each peripheral circuit. I/O buffer 55 can be coupled to control circuit 70 and act as a control buffer to buffer and relay control commands received from a host to control circuit 70 and status information received from control logic circuit to the host. I/O buffer 55 can also be coupled to column decoder/bit line driver 52 via a data bus and act as a data input/output (I/O) interface and a data buffer to buffer and relay the data to and from memory cell array 340.

Figure 5:
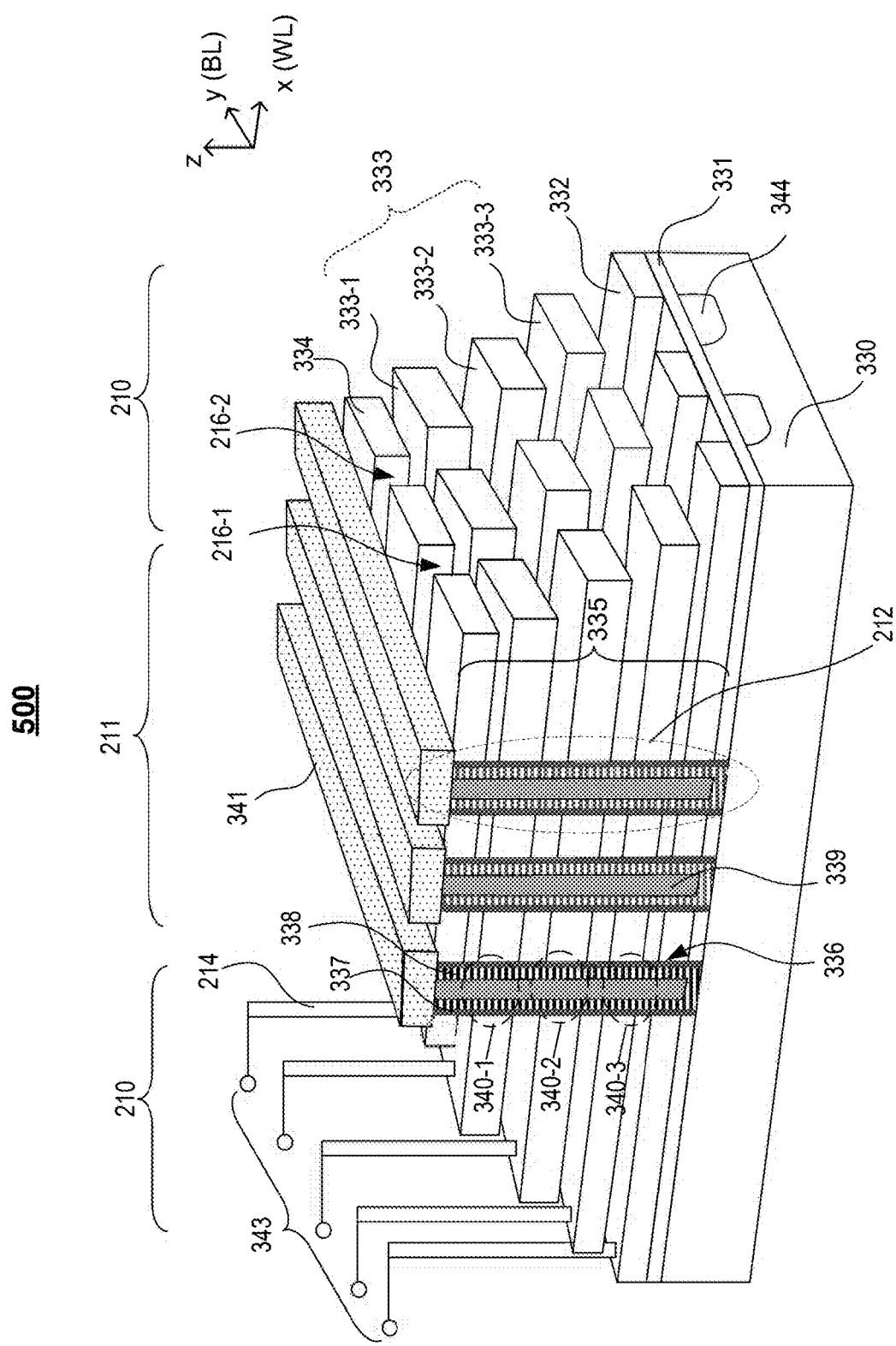
FIG. 5 illustrates a perspective view of a portion of a 3D memory structure, in accordance with some embodiments.

FIG. 5 illustrates a perspective view of a 3D memory structure 500, according to some embodiments. In some embodiments, memory die 100 can be a 3D NAND memory, and 3D memory structure 500 can be a portion of memory die 100, for example, in a region 108 in FIG. 3. 3D memory structure 500 can include a staircase region 210 and a channel structure region 211. Channel structure region 211 can include a plurality of memory strings 212, each including a plurality of stacked memory cells 340. Staircase region 210 can include a staircase structure.

In some embodiments, the 3D memory structure 500 can include a substrate 330, an insulating film 331 over the substrate 330, a tier of lower select gates (LSGs) 332 over the insulating film 331, and a plurality of tiers of control gates 333, also referred to as "word lines," stacking on top of the LSGs 332 to form a film stack 335 of alternating conductive and dielectric layers. The dielectric layers adjacent to the tiers of control gates are not shown in FIG. 5 for clarity.

In some embodiments, the control gates of each tier are separated by slit structures 216-1 and 216-2 through the film stack 335. The 3D memory structure 500 can also include a tier of top select gates (TSGs) 334 over the stack of control gates 333. The stack of TSG 334, control gates 333 and LSG 332 can also be referred to as "gate electrodes." The 3D memory structure 500 can further include doped source line regions 344 in portions of substrate 330 between adjacent LSGs 332. Each of memory strings 212 of the 3D memory structure 500 can include a channel hole 336 extending through the insulating film 331 and the film stack 335 of alternating conductive and dielectric layers. Memory string 212 can also include a memory film 337 on a sidewall of the channel hole 336, a channel layer 338 over memory film 337, and a core filling film 339 surrounded by channel layer 338. Memory cell 340 (e.g., 340-1, 340-2, 340-3) can be formed at the intersection of the control gate 333 (e.g., 333-1, 333-2, 333-3) and memory string 212. A portion of channel layer 338 can respond to the respective control gate and is also referred to as channel 338 of the memory cell. The 3D memory structure 500 further includes a plurality of bit lines (BLs) 341 connected with the memory strings 212 over the TSGs 334. The 3D memory structure 500 can also include a plurality of metal interconnect lines 343 connected with the gate electrodes through a plurality of contact structures 214. The edge of film stack 335 is configured in a shape of staircase to allow an electrical connection to each tier of the gate electrodes.

In FIG. 5, for illustrative purposes, three tiers of control gates 333-1, 333-2, and 333-3 are shown together with one tier of TSG 334 and one tier of LSG 332. In this example, each memory string 212 can include three memory cells 340-1, 340-2 and 340-3, corresponding to control gates 333-1, 333-2 and 333-3, respectively. In some embodiments, the number of control gates and the number of memory cells can be more than three to increase storage capacity. The 3D memory structure 500 can also include other structures, for example, TSG cut, common source contact (i.e., array common source) and dummy memory string. These structures are not shown in FIG. 5 for simplicity. It is noted that the 3D memory structure 500 shown in FIG. 5 is only used as an example, which does not limit the scope of the present disclosure, and any other suitable 3D memory structure can also be adapted. It should be understood that FIG. 5 is for illustrative purposes only. A person skilled in the pertinent art will recognize that other 3D memory structures can be used without departing from the spirit and scope of the present disclosure.

Referring back to FIG. 4, in some embodiments, memory block 103 can be formed based on floating gate technology. In some embodiments, the memory block 103 can be formed based on charge trapping technology. The NAND flash memory based on charge trapping can provide high storage density and high intrinsic reliability. Storage data in the form of logic states ("states," e.g., threshold voltages $V_{th}$ of the memory cell 340) depends on the number of charge carriers trapped in the memory film 337 of the memory cell 340.

In some embodiments, in a NAND flash memory, a read operation and a write operation (also referred to as program operation) can be performed for the memory page 432, and an erase operation can be performed for the memory block 103.

In some embodiments, in a NAND memory, the memory cell 340 can be in an erased state ER or a programmed state P1. Initially, memory cells 340 in memory block 103 can be reset to the erased state ER as logic "1" by implementing a negative voltage difference between control gates 333 and channel 338 such that trapped charge carriers in the memory film of memory cells 340 can be removed. For example, the negative voltage difference can be induced by setting control gates 333 of memory cells 340 to ground, and applying a high positive voltage (an erase voltage $V_{erase}$) to ACS 430. At the erased state ER ("state ER"), the threshold voltage $V_{th}$ of memory cells 340 can be reset to the lowest value.

In some embodiments, during programming (i.e., writing), a positive voltage difference between control gates 333 and channel 338 can be established by, for example, applying a program voltage $V_{pgm}$ (e.g., a positive voltage pulse between 10 V and 20 V) on control gate 333, and grounding the corresponding bit line 341. As a result, charge carriers (e.g., electrons) can be injected into the memory film of memory cell 340, thereby increasing the threshold voltage $V_{th}$ of memory cell 340. Accordingly, memory cell 340 can be programmed to the programmed state P1 ("state P1" or logic "0").

In some embodiments, the state of the memory cell (e.g., state ER or state P1) can be determined by measuring or sensing the threshold voltage $V_{th}$ of the memory cell. During a read operation, a read voltage $V_{read}$ can be applied on control gate 333 of the memory cell and current flowing through the memory cell can be measured at bit line 341. A pass voltage $V_{pass}$ can be applied on unselected word lines to switch on unselected memory cells.

In some embodiments, a NAND flash memory can be configured to operate in a single-level cell (SLC) mode. To increase storage capacity, a NAND flash memory can also be configured to operate in a multi-level cell (MLC) mode, a triple-level cell (TLC) mode, a quad-level cell (QLC) mode, or a combination of any of these modes. In the SLC mode, a memory cell stores 1 bit and has two logic states, logic {1 and 0}, i.e., states ER and S1 (state ER can also be referred to as S0). In the MLC mode, a memory cell stores 2 bits, and has four logic states, logic {11, 10, 01, and 00}, i.e., states ER, M1, M2, and M3 (state ER can also be referred to as M0). In the TLC mode, a memory cell stores 3 bits, and has eight logic states, logic {111, 110, 101, 100, 011, 010, 001, 000}, i.e., states ER, and states T1-T7 (state ER can also be referred to as T0). In the QLC mode, a memory cell stores 4 bits and has 16 logic states, logic {1111, 1110, 1101, 1100, 1011, 1010, 1001, 1000, 0111, 0110, 0101, 0100, 0011, 0010, 0001, 0000}, i.e., states ER, and states Q1-Q15 (state ER can also be referred to as Q0). Memory controller 20 of storage system 10 (see FIG. 1) can convert data received from host 15 into corresponding logic states of the memory cells on memory dies 100 and vice versa.

Figure 6A:
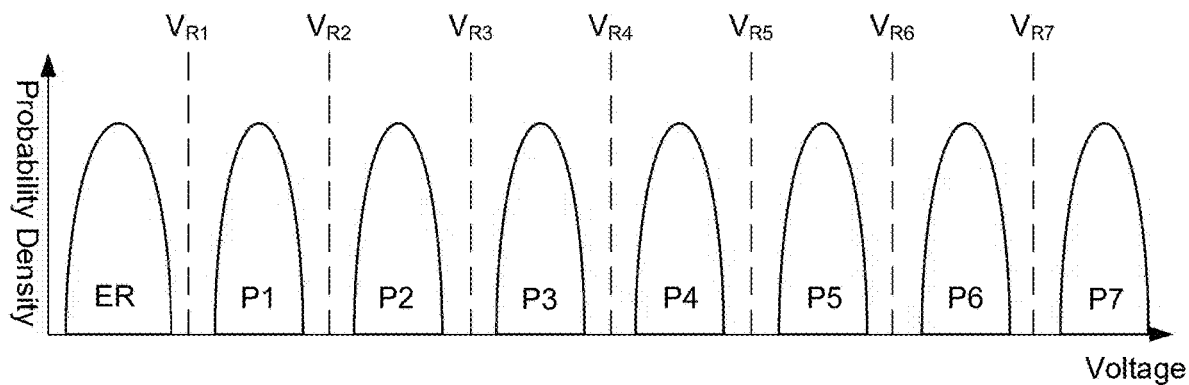
FIG. 6A illustrates a threshold voltage $V_{th}$ distribution of memory cells in a NAND flash memory, according to some embodiments.

FIG. 6A illustrates a threshold voltage $V_{th}$ distribution of a NAND flash memory programmed in the SLC, MLC, or TLC modes, according to some embodiments. In some embodiment of the SLC mode, state S1 may correspond to state P1. In some embodiment of the MLC mode, states M1-M3 may correspond to states P1-P3. In some embodiment of the TLC mode, states T1-T7 may correspond to states P1-P7. In some embodiments, each state of the memory cells can correspond to a specific range of threshold voltage $V_{th}$, where the threshold voltage $V_{th}$ distribution of each state can be represented by a probability density. In some embodiments, the states can be programmed by using an incremental step pulse programming (ISPP) scheme, in which the programming voltage provided to word lines included multiple voltage pulses, and an amplitude of each voltage pulse $V_{pgm}$ can be incrementally increased by adding a value ΔV to an amplitude of a previous voltage pulse. For example, the eight TLC states can be programmed from state ER corresponding to a lower threshold voltage to state T7 corresponding to a highest threshold voltage using the ISPP scheme.

Figure 6B:
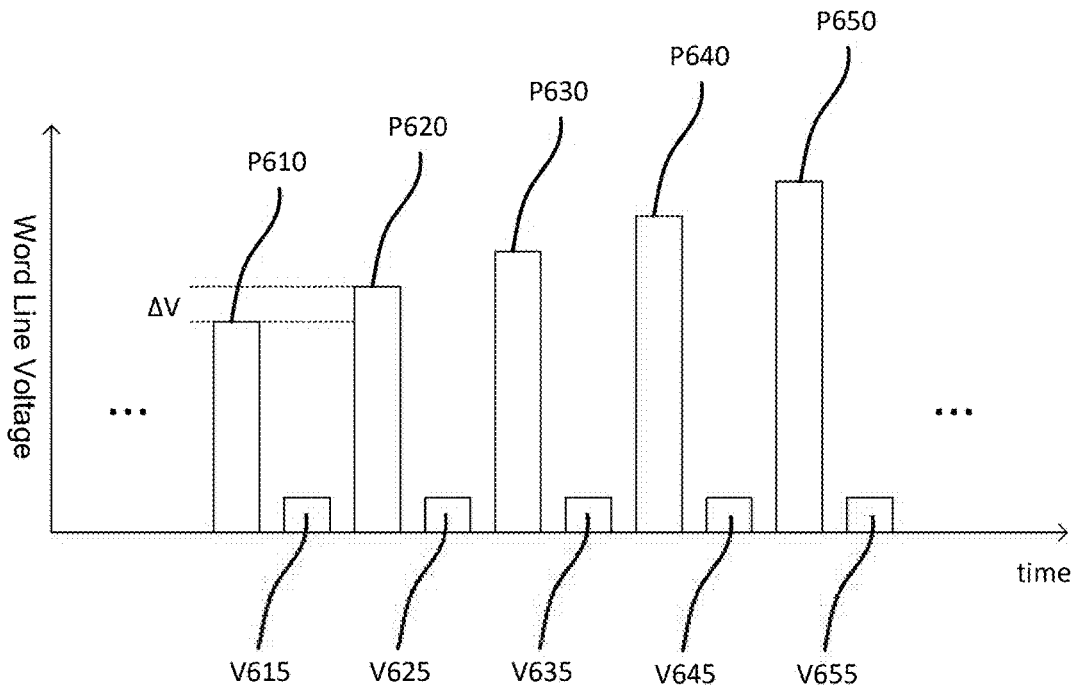
FIG. 6B illustrates an example of a signal provided to a word line in a programming-verification process, according to some embodiments.

FIG. 6B illustrates an example of a signal provided to a word line in a programming-verification process, according to some embodiments. During a programming process, programming voltage pulses P610-P650 are provided to a word line. Each of the programming voltage pulses has an amplitude greater than the programming voltage pulse right before it by a value ΔV. For example, P620 is greater than P610 by ΔV, P630 is greater than P620 by ΔV, etc. In the ISPP scheme, a verification operation can be performed by page buffer/sense amplifier 50, following each programming voltage pulses provided to the word line. In FIG. 6B, verification voltages V615-V655 are provided to the word line for the verification operation. For example, verification voltage V615 is sent to the word line after programming voltage pulse P610, so that page buffer 50 can verify if memory cells coupled to the word line are programmed according to the data in page buffer/sense amplifier 50. The verification operation checks whether the memory cell has been programmed into the state. In some embodiments, after each programming voltage $V_{pgm}$ is provided to the word line, the states ER and P1-P7 can be verified by using one or more read reference voltages $V_{R1}$-$V_{R7}$ during a verification operation. By applying one or more of the read reference voltages $V_{R1}$-$V_{R7}$ to the control gate of a target memory cell, the range of the memory cell's threshold voltage $V_{th}$ can be determined. For example, to verify if a memory cell is at state P1, verification voltages V615-V655 can have an amplitude of the read reference voltage $V_{R1}$. If the target memory cell is at state ER, the threshold voltage $V_{th}$ of the target memory cell is lower than the read reference voltage $V_{R1}$. The target memory cell can be switch on and form a conductive path in the channel. If the target memory cell is programmed into the states P1, the threshold voltage $V_{th}$ of the target memory cell is higher than the read reference voltage $V_{R1}$. The target memory cell is thereby switched off. By measuring or sensing the current through the target memory cell at the corresponding bit line, via page buffer/sense amplifier 50, the threshold voltage $V_{th}$ or the state of the target memory cell can be verified. The programming process ends once the memory cell is verified to be programmed into P1.

It is possible that, under certain situation, a programming operation on a memory cell fails, which can be detected by the verification operation. For example, in some embodiments, a maximum number of incremental step pulses in a programming operation is not infinite but finite. If, after the maximum number of programming voltage pulses have been provided to the word line, the verification operation detects that a memory cell has a threshold voltage lower than that of a state the memory cell should be programmed into according to data in page buffer 50, the programming operation on the memory cell fails. In another example, when a verification operation detect that a memory cell is in a state with a threshold voltage higher than that of a state the memory cell should to be programmed into according to data in page buffer 50, further programming voltage pulses with incremental amplitudes can no longer correct the memory cell into the proper state to be programmed into, and the programming operation on the memory cell fails. Memory cells fail to be programmed properly are also referred as 'fail-bits'. In some embodiments, the number of memory cells verified as fail-bits provides important information about the quality and performance of the memory device, and the function of counting the quantity of fail-bits can be done by a device referred to as a VFC circuit (for example, VFC circuit 80 in FIG. 4).

When a verification operation detects a fail-bit, the page buffer can generate a signal and send it to the VFC circuit. In some embodiments, the signal sent to the VFC circuit can be a digital signal representing that a fail-bit is verified, and the VFC circuit can include an addition logic to count the number of times the digital signal is of received (for example, within a period of time, or within a scanning process that verifies a number of memory cells in the memory device), and output the total number of fail-bits. In some embodiments, the signal sent to the VFC circuit can be an analog signal (for example a current or a voltage of certain amplitude), and the VFC circuit can include an analog processing unit that processes the analog signals received and provides an output signal representing the quantity of fail-bits. For example, the output signal can be a digital signal that directly indicates the quantity of fail-bits. In another example, the output signal can be an analog voltage or current signal with an amplitude proportional to the quantity of fail-bits.

In some embodiments, using analog signals instead of digital signals to represent detections of fail-bits provides a benefit of higher processing speed for the VFC circuit. However, when using analog signals to represent detections of fail-bits, the output signal of the VFC circuit may not accurately indicate the actual number of fail-bits. For example, in a case called 'overcount', the output signal of the VFC circuit indicates a greater number than the actual number of fail-bits. In another example, in a case called 'undercount', the output signal of the VFC circuit indicates a number less than the actual number of fail-bits. The cause of overcount or undercount may be mismatch within the analog processing unit in the VFC circuit, for example, due to defects or aging of electronic elements in the analog processing unit.

Figure 7A:
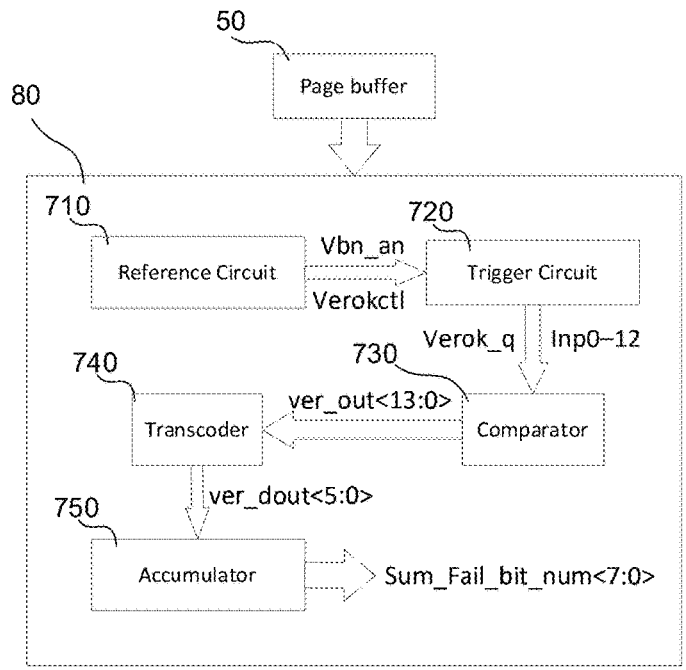
FIG. 7A illustrates a diagram of an exemplary structure of a VFC circuit.
Figure 7B:
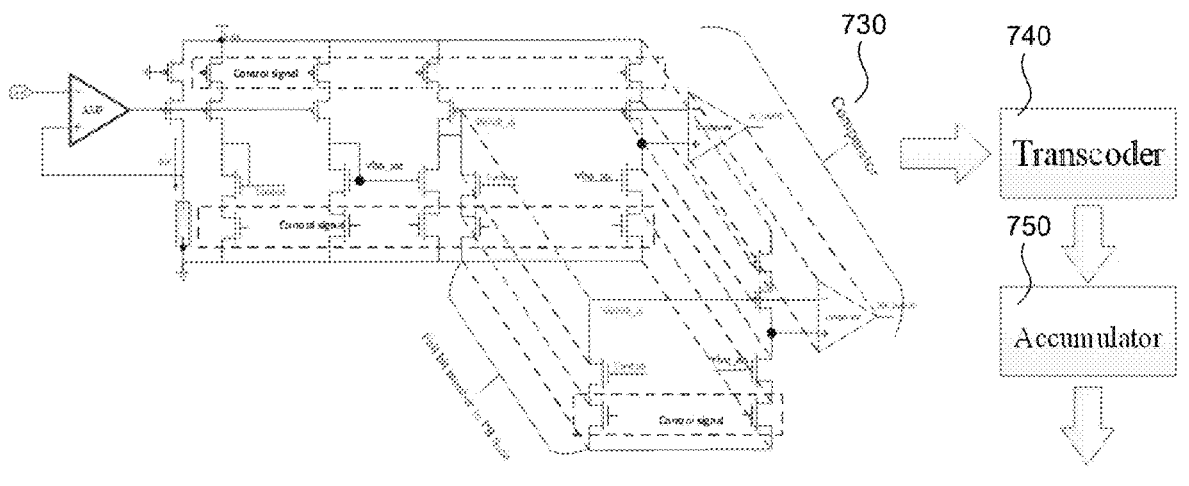
FIG. 7B illustrates an exemplary schematic diagram of a VFC circuit.

FIG. 7A illustrates a diagram of an exemplary structure performing the function of counting the quantity of fail-bits. FIG. 7B illustrates a diagram of an exemplary schematic diagram of the structure performing the function of counting the quantity of fail-bits. A VFC circuit 80 is coupled to a page buffer 50 and includes a reference circuit 710, a trigger circuit 720, a comparator 730, a transcoder 740, and an accumulator 750. The schematic diagram of VFC 80 is given in FIG. 7B. The function of counting the quantity of fail-bits starts from providing a verification standard signal by reference circuit 710. Trigger circuit 720 can receive verify error bit current from page buffer 50 and provide a verification error bit signal. Comparator 730 includes a plurality of amplifiers, each compares the verification standard signal and the verification error bit signal and output a comparison result to transcoder 740. Transcoder 740 converts a plurality of comparison results provided by comparator 730 into a plurality of binary codes, and transmit the plurality of binary codes to accumulator 750. Accumulator 750 accumulates the plurality of binary codes, and outputs a final result of the quantity of fail-bits. In some embodiments, accumulator 750 uses flip-flop to accumulate. In some embodiments, VFC circuit 80 in FIGS. 7A and 7B senses fail-bit quantity by analog method by sensing current, and the output of the VFC circuit 80 is affected by internal mismatch. In some embodiments, VFC circuit 80 uses current during sensing fail-bit number, and the overall current has a certain offset, or the overall bias current has a mismatch, and the quantity of fail bits counted by VFC circuit 80 may not accurately reflect the actual amount of fail bits, for example, VFC circuit 80 has undercount or overcount. In order to improve the performance of VFC circuit 80, the internal mismatch of VFC circuit 80 needs to be compensated.

In some embodiments, an offset adjustment mechanism can be included in the VFC circuit to compensate the mismatch of the analog processing unit and avoid the issue of undercount or overcount, so that the VFC circuit can provide accurate output signal that indicates the actual number of fail-bits detected. In some embodiments, the offset adjustment mechanism can include a comparator and an offset trimming unit. The comparator can compare a difference between the output signal of the VFC circuit and a calibration input signal. According to the difference, the offset trimming unit can generate an offset signal, which is provided to the analog processing unit to compensate the mismatch.

Figure 8:
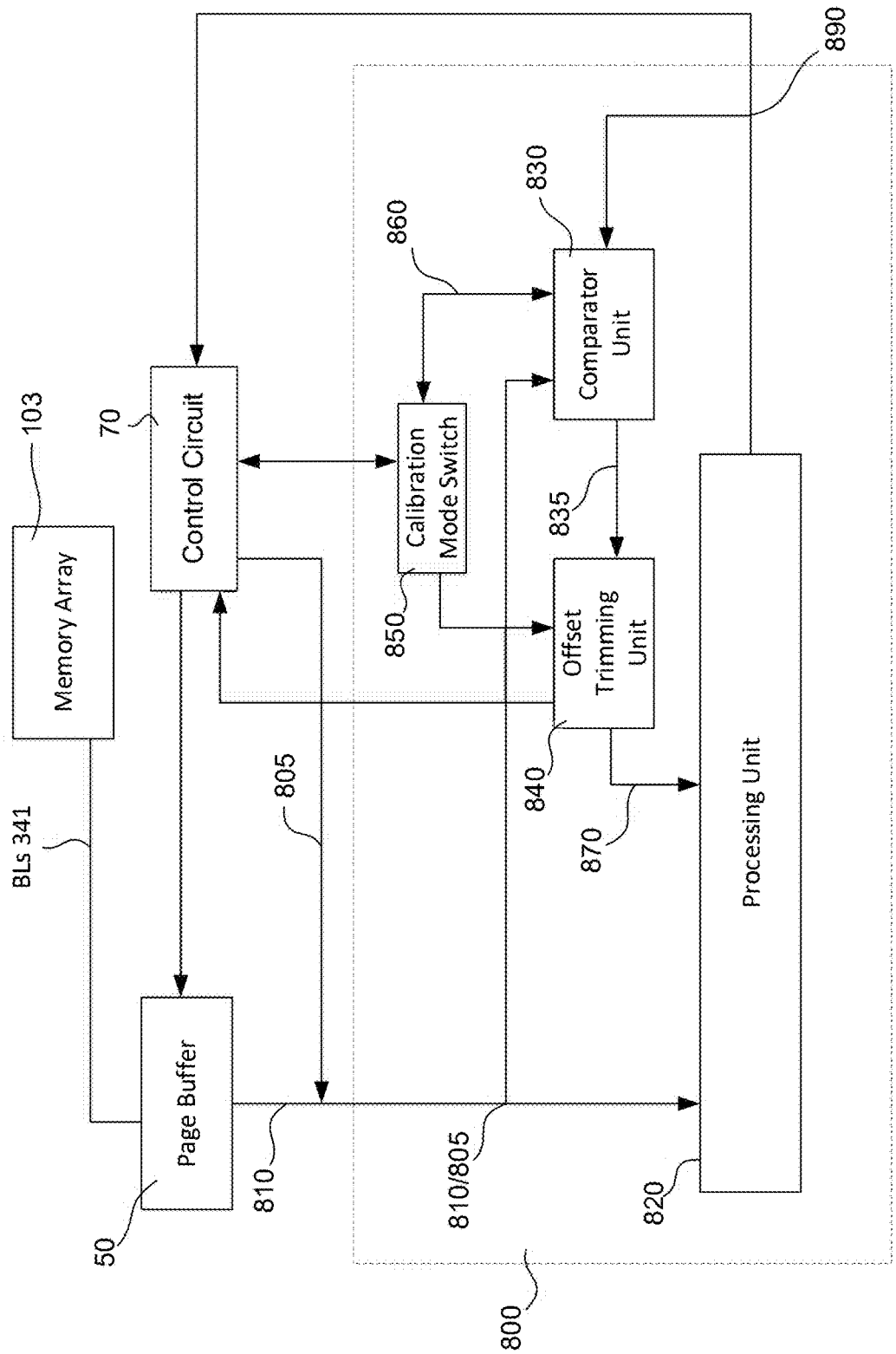
FIG. 8 illustrates a diagram of circuits and elements involved in counting a quantity of fail-bits in a memory array, including a VFC circuit with a mechanism of adjusting an offset, according to some embodiments.

FIG. 8 illustrates a diagram of circuits and elements involved in counting a quantity of fail-bits in a memory array by a VFC circuit, in which the VFC circuit has a mechanism of adjusting an offset to compensate a mismatch of an analog processing unit in the VFC circuit, according to some embodiments. In FIG. 8, a page buffer 50 is coupled to a memory array 103 via bit lines 341. A control circuit 70 is coupled to page buffer 50 and can provide operational instructions to page buffer 50. Page buffer 50 is coupled to a VFC circuit 800. Memory array 103, bit lines 341, control circuit 70, and page buffer 50 in FIG. 8 can be the same as or similar to their correspondence in FIG. 4.

Under a verification operation controlled by control circuit 70, page buffer 50 can detect fail-bits in memory array 103. Signals 810 representing detections of fail-bits can be generated by page buffer 50 and sent to VFC circuit 800. VFC circuit 800 includes a processing unit 820, which can processes signals 810 and output a signal 890 that represents a quantity of fail-bits in memory array 103 verified by page buffer 50. In some embodiments, processing unit 820 can have a same or similar structure as VFC circuit 80 in FIG. 7A. For example, processing unit 820 can include reference circuit 710, trigger circuit 720, comparator 730, transcoder 740, and accumulator 750. In some embodiments, processing unit 820 can perform similar functions as VFC circuit 80 in FIG. 7A. Signal 890 can be provided to control circuit 70 for further purposes, such as evaluating the performance and quality of memory array 103, by comparing the counted quantity of fail-bits with a baseline quantity corresponding to a quality standard. In some embodiments, signals 810 can be digital signals. For example, signals 810 can be a plurality of digital signals each representing a digital value of '1', and processing unit 820 can include a digital addition circuit that counts the number of signals 810 and output signal 890 in a digital manner to indicate the quantity of fail-bits counted. In some embodiments, signals 810 can be analog signals. For example, signals 810 can be a plurality of current or voltage signals, each having a constant amplitude, and processing unit 820 can include an analog circuit that process signals 810 and output signal 890 in either digital or analog manner to indicate the quantity of fail-bits counted. For example, signal 890 can be a voltage signal having an amplitude proportional to the quantity of fail-bits.

In some embodiments, if signals 810 are analog signals, signal 890 may not accurately indicate the actual quantity of fail-bits, due to possible mismatch in the analog part in processing unit 820. For example, signal 890 can overcount or undercount the actual quantity of fail-bits. In some embodiments, the mismatch in processing unit 820 can be compensated by an offset signal 870 determined by a calibration operation. In some embodiments, as shown in FIG. 8, VFC circuit 800 can include a calibration mode switch 850, a comparator unit 830, and an offset trimming unit 840. Calibration mode switch 850 can be controlled by control circuit 70 and can switch a calibration mode of VFC circuit 800 ON and OFF. In some embodiments, calibration mode switch 850 can be integrated in control circuit 70. In the calibration operation, control circuit 70 switches ON the calibration mode via calibration mode switch 850, and offset signal 870 can be generated by comparator unit 830 and offset trimming unit 840, and be provided to processing unit 820 compensate the mismatch in processing unit 820.

In the calibration operation, control circuit 70 can instruct VFC circuit 800 to receive a calibration signal 805 from control circuit 70 instead of signals 810 provided by page buffer 50. Calibration signal 805 is an analog signal having an amplitude corresponding to a calibration number. The calibration number can be a non-negative number (e.g., 5, 79, 161, 4123, etc). Calibration signal 805 is provided to processing unit 820 and comparator unit 830. Processing unit 820 can combine calibration signal 805 with offset signal 870 to generate signal 890, which corresponds to an output number. Signal 890 is also provided to comparator unit 830, in which the calibration number and the output number, as represented by signal 805 and signal 890, respectively, are compared. If a difference between the output number and the calibration number is zero, VFC circuit 800 can generate signal 890 that accurately indicates the calibration number, which means that offset signal 870 effectively compensates the mismatch in processing unit 820. In this case, the calibration operation is completed, and the comparator can further notify calibration mode switch 850 to turn off calibration mode. If the difference between the output number and the calibration number is nonzero, signal 890 generated by VFC circuit 800 does not accurately indicate the calibration number, which means that offset signal 870 does not effectively compensate the mismatch in processing unit 820. In this case, a signal 835 representing the difference between the output numbers and the calibration number is generated by comparator unit 830 and provided to offset trimming unit 840, which can adjust offset signal 870. In some embodiments, signal 835 can be a voltage signal with a positive or negative value, representing the output number being greater or smaller than the calibration number, respectively.

In some embodiments, offset trimming unit 840 can provide or adjust offset signal 870, according to signal 835. In some embodiments, offset trimming unit 840 can include an analog circuit (for example, an operational amplifier) and generate offset signal 870 with continuous values as a function of signal 835. For example, offset signal 870 can be proportional to signal 835 and having a value that can compensate signal 890, such that the output number matches the calibration number. In some embodiments, offset trimming unit 840 can include a digital circuit (for example, a digital adder-subtractor) and adjust offset signal 870 among discrete values. For example, according to signal 835 being positive or negative, trimming unit 840 can adjust offset signal 870 from a present value to a new value adjacent to the present value, such that the difference between the output number and the calibration number is reduced.

In some embodiments, if the difference between the output number and the calibration number is positive (i.e. the output number is greater than the calibration number), offset trimming unit 840 can update offset signal 870 by decreasing its amplitude. Offset signal 870 with updated lower amplitude is further processed, together with calibration signal 805, by processing unit 820 to generate signal 890, which corresponds to the output number with a smaller value, reducing the positive difference between the output number and the calibration number.

In some embodiments, if the difference between the output number and the calibration number is negative (i.e. the output number is smaller than the calibration number), offset trimming unit 840 can update offset signal 870 by increasing its amplitude. Offset signal 870 with updated larger amplitude is further processed, together with calibration signal 805, by processing unit 820 to generate signal 890, which corresponds to the output number with a greater value, reducing the negative difference between the output number and the calibration number.

The above three-step process of i) processing calibration signal 805 and offset signal 870 and generating signal 890 by processing unit 820, ii) comparing the difference between the output number and the calibration number, corresponding to calibration signal 805 and signal 890, respectively, by comparator unit 830, and iii) updating offset signal 870 by offset trimming unit 840 according to the difference between the output number and the calibration number, is repeated until the difference between the output number and the calibration number reaches zero, when the calibration operation is finished. In some embodiments, after offset signal 870 is properly adjusted, offset trimming unit 840 can send offset signal 870 to control circuit 70 for storage. Over time, the mismatch in processing unit 820 can shift (e.g., due to aging of analog electronic elements in processing unit 820), and the calibration operation can be conducted as needed to adjust offset signal 870 to compensate the shifted mismatch. For example, the calibration operation can be conducted periodically (e.g., once every six months, once a year, or once every two years), or according to the intensity of using the memory device.

In some embodiments, calibration signal 805 can be generated by control circuit 70 according to calibration instructions stored in control circuit 70. In some embodiments, calibration signal 805 can be provided by external input (for example, via user input/output interfaces) to control circuit 70, and further transmitted to VFC circuit 800. In some embodiments, multiple calibration signals, each corresponding to a different calibration number, can be used in the calibration operation. In some embodiments, different calibration numbers within a range used in the calibration operation can generate offset signals of the same amplitude.

Figure 9:
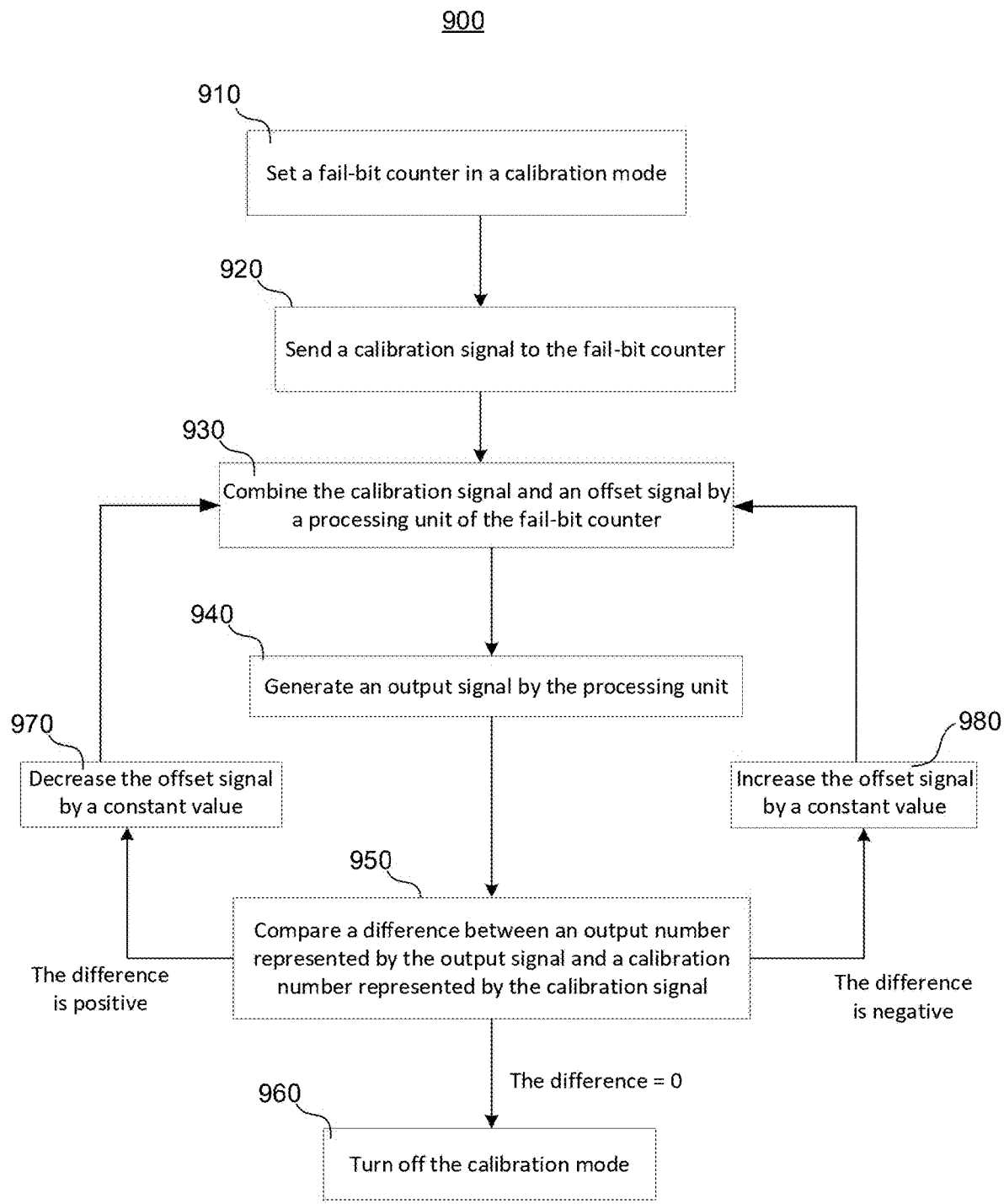
FIG. 9 illustrates an example of a method to calibrate a VFC circuit, according to some embodiments.

FIG. 9 illustrates an example of a method 900 to calibrate a VFC circuit in a calibration operation, according to some embodiments. The VFC circuit can be coupled to a page buffer and a control unit of a memory device, and can count a quantity of fail-bits in a memory array of the memory device, as verified by the page buffer. For example, the VFC circuit can be VFC circuit 800, as shown in FIG. 8.

In block 910, the VFC circuit is set in a calibration mode. The calibration mode can be turned on by a switch controlled by the control unit. For example, the calibration mode can be turned on by calibration mode switch 850, as shown in FIG. 8.

In block 920, a calibration signal can be sent to the VFC circuit. The calibration signal can be an analog signal (e.g., an analog current or voltage signal). The calibration signal can have an amplitude corresponding to a calibration number. For example, the calibration signal can be calibration signal 805 provided by control signal 70, as shown in FIG. 8.

In block 930, the calibration signal, together with an offset signal, can be combined by a processing unit of the VFC circuit. The offset signal can be generated by the VFC circuit in order to compensate a mismatch of the processing unit. For example, the offset signal can be offset signal 870 in FIG. 8. The processing unit includes analog electronic element and, according to the calibration signal and the offset signal, can generate an output signal corresponding to an output number, as shown in block 940. For example, the processing unit can be processing unit 820, and the output signal can be signal 890, as shown in FIG. 8.

In block 950, the calibration number and the output number are compared. The calibration number and the output number can be compared by sending the calibration signal and the output signal to a comparator. For example, as shown in FIG. 8, calibration signal 805 and output signal 890 can be sent to comparator unit 830. The comparator can generate a difference between the output number and the calibration number. According to the value of the difference, the calibration operation can proceed in three different directions.

If the difference is zero, as shown in block 960, the calibration operation is finished, and the calibration mode can be turned off. In this case, the offset signal can compensate the mismatch of the processing unit, which generates the output signal corresponding to the output number matching the calibration number.

If the difference is positive, as shown in block 970, the amplitude of the offset signal is decreased by a constant value. After being adjusted, the offset signal is provided back to the processing unit, which process the updated offset signal and the calibration signal (as shown in block 930) to generate the output signal (as shown in block 940) corresponding to an updated output number. The constant value is chosen such that the updated output number is changed from the output number by 1. The updated output number is further compared with the calibration number, as shown in block 950, in which an updated difference between the updated output number and the calibration number is closer to zero, compared with the difference in the previous comparison in block 950. The loop of block 950→block 970→block 930→block 940→block 950 is repeated, until the output number matches the calibration number, i.e., the difference is zero. The calibration operation then proceeds to block 960 to turn off the calibration mode.

If the difference is negative, as shown in block 980, the amplitude of the offset signal is increased by the constant value. After being adjusted, the offset signal is provided back to the processing unit, which process the updated offset signal and the calibration signal (as shown in block 930) to generate the output signal (as shown in block 940) corresponding to an updated output number greater than the output number by 1. The updated output number is further compared with the calibration number, as shown in block 950, in which an updated difference between the updated output number and the calibration number is closer to zero, compared with the difference in the previous comparison in block 950. The loop of block 950→block 980→block 930→block 940→block 950 is repeated, until the output number matches the calibration number, i.e., the difference is zero. The calibration operation then proceeds to block 960 to turn off the calibration mode.

After the calibration operation is finished, the VFC circuit can be functioning in a regular working mode and accurately count the quantity of fail-bits in the memory device. The counted quantity of fail-bits can be compared with a baseline quantity chosen according to a quality standard, so that the quality and/or performance of the memory device can be evaluated.

Figure 10A:
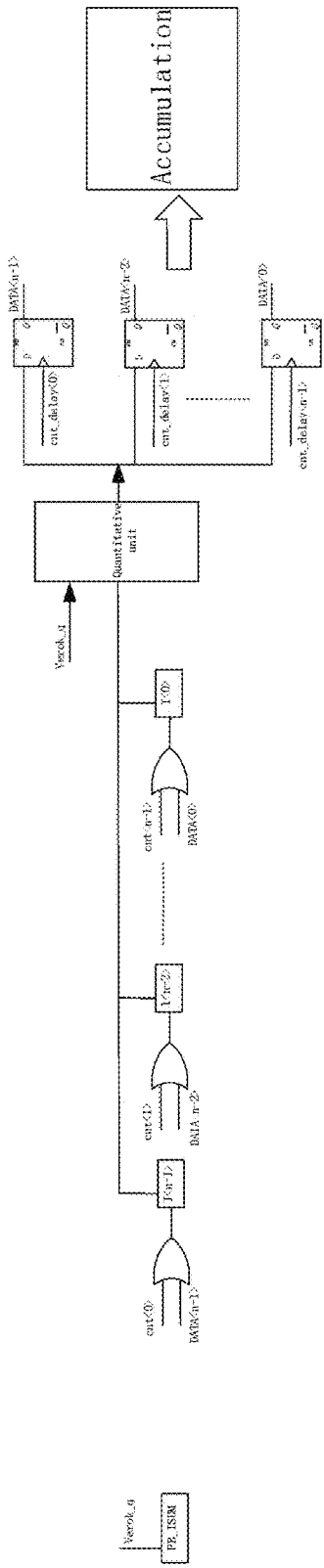
FIG. 10A illustrates an exemplary schematic diagram of a VFC circuit without a mechanism of adjusting an offset, according to some embodiments.

FIG. 10A illustrates an exemplary schematic diagram of a VFC circuit without a mechanism of adjusting an offset, according to some embodiments. The output of the VFC circuit is affected due to the internal mismatch. In some embodiments, the VFC circuit uses current during sensing fail-bit number, and the overall current has a certain offset, or the overall bias current has a mismatch, and the quantity of fail bits counted by the VFC circuit may not accurately reflect the actual amount of fail bits, for example, the VFC circuit has undercount or overcount. In order to improve the performance of the VFC, the internal mismatch of the VFC needs to be compensated.

Figure 10B:
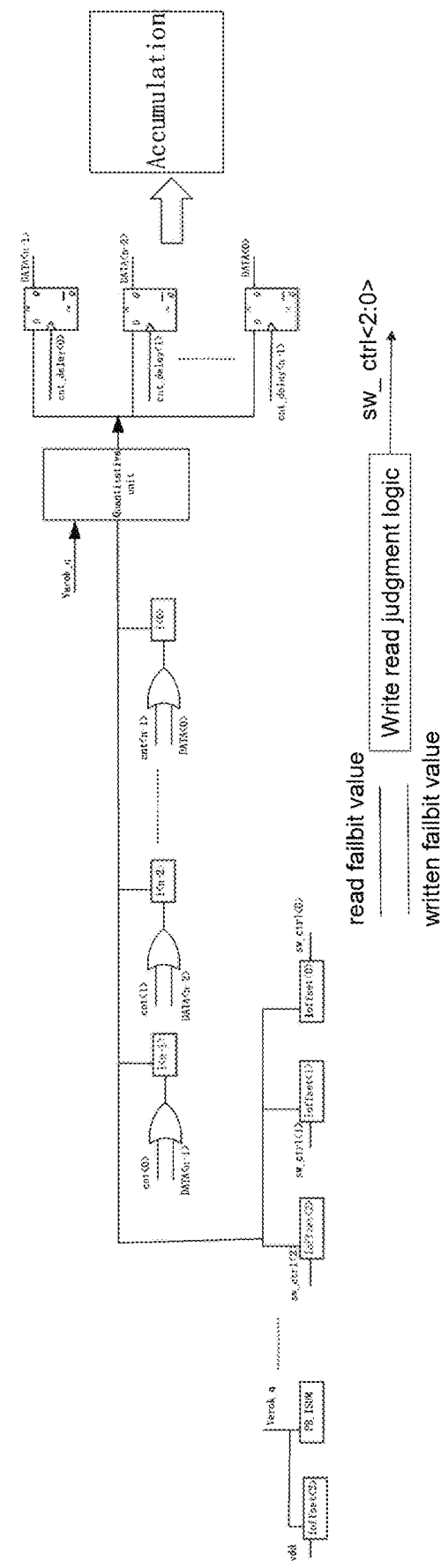
FIG. 10B illustrates an exemplary schematic diagram of a VFC circuit with a mechanism of adjusting an offset, according to some embodiments.

FIG. 10B illustrates an exemplary schematic diagram of a VFC circuit with a mechanism of adjusting an offset, according to some embodiments. In some embodiment, reset is performed in the initial state, and the default data is set to 0; After that, the first clock is high, and the highest bit data is output. After comparing the cnt with stable data output_, when the delay<0>clock comes, select I<n−1> to open or close the reference current branch according to the value of the highest bit output DATA<n−1>; Compare in turn until the lowest data is output, and then output all the data.

The write read judgment logic can write a failbit value before the VFC circuit works, make a judgment with the read data value, and select the corresponding offset control bit sw_Ctrl<2:0>; The VFC circuit later adopts the adjusted values; Thus, the yield loss introduced by mismatch is improved.

Write read judgment logic relationship: default sw_ctrl<2:0>=100

Read data value=written failbit value, sw_ctrl<2:0>=sw_ctrl<2:0>

Read data value>written failbit value, sw_ctrl<2:0>=sw_ctrl<2:0>+1

Read data value<written failbit value, sw_ctrl<2:0>=sw_ctrl<2:0>−1

Adjust circularly until the read data value=the written failbit value exits the write read judgment logic, and then the VFC circuit uses the adjusted sw_Ctrl<2:0>.

Figure 11A:
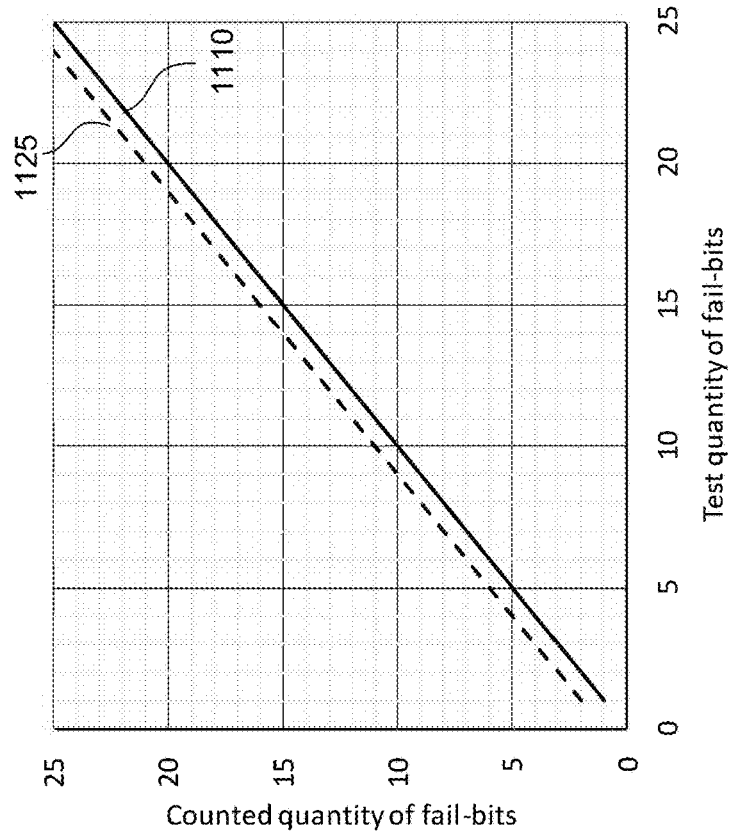
FIGS. 11A and 11B illustrate examples of simulated performances of a VFC circuit before and after a calibration, according to some embodiments.
Figure 11B:
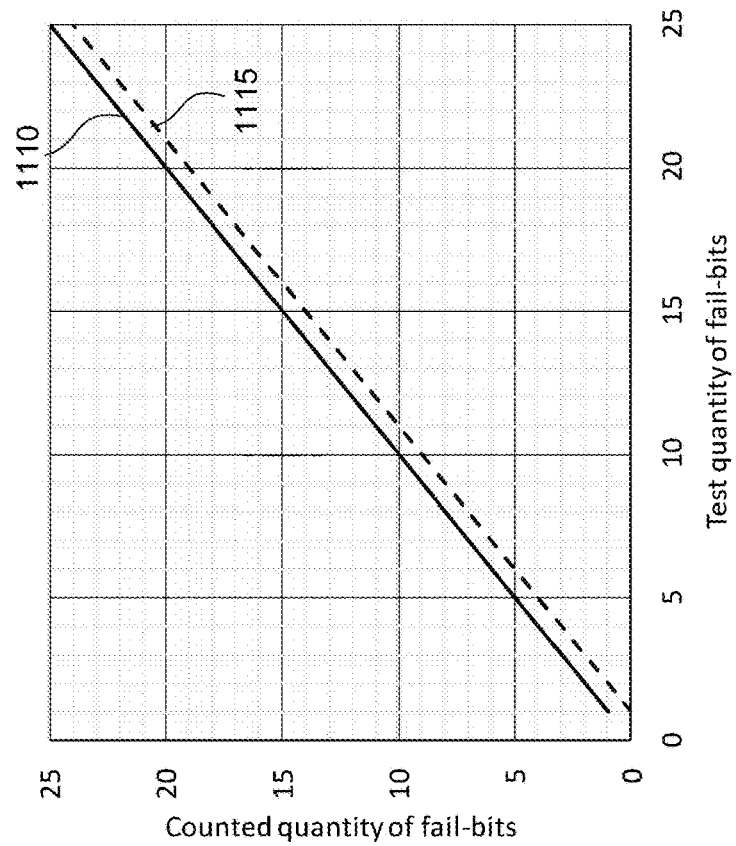

FIGS. 11A and 11B illustrate examples of simulated performances of a VFC circuit before and after a calibration, according to some embodiments.

FIG. 11A includes a dataset 1115 showing a relation between test numbers of fail-bits (in a range between 1 and 25) input into a VFC circuit and counted fail-bit quantities output by the VFC circuit, when the VFC circuit has mismatch and is undercounting. For each data point in dataset 1115, the counted fail-bit quantity is less than the test quantity of fail-bits by 1. In some embodiments, by default, the sw_ctrl<2:0> value is 100. When the circuit has a mismatch that causes the PB_ISUM current to be low or the bias current to be high, an undercount will occur. At this time, the value read out after the failbit is input is smaller than the input value. The sw_ctrl<2:0> value is reduced by writing the read out judgment logic, so that the undercount disappears.

Similarly, FIG. 11B includes a datasets 1125 showing a relation between test numbers of fail-bits (also in a range between 1 and 25) input into the VFC circuit and counted fail-bit quantities output by the VFC circuit, when the VFC circuit has mismatch and is overcounting. For each data point in dataset 1125, the counted fail-bit quantity is greater than the test quantity of fail-bits by 1. In some embodiments, by default the sw_ctrl<2:0>value is 100. When the circuit has a mismatch that causes the PB_ISUM current to be high or the bias current to be lower, an overcount will occur. At this time, the value read out after the failbit is input is larger than the input value. The sw_ctrl<2:0>value is increased by writing the read out judgment logic, so that the overcount disappears.

Both FIGS. 11A and 11B include a dataset 1110 showing a relation between test numbers of fail-bits input into the VFC circuit and counted fail-bit quantities output by the VFC circuit, when the mismatch of the VFC circuit is properly compensated by an offset via a calibration operation. For each data point in dataset 1110, the counted fail-bit quantity matches the test quantity of fail-bits well.

In summary, the present disclosure provides embodiments of devices, systems, and methods for counting a quantity of fail-bits in a memory device using a VFC circuit. The VFC circuit can be calibrated via an offset adjustment mechanism to compensate an internal mismatch of an analog processing unit in the VFC circuit.

In some embodiments, a memory device can include a memory array and a peripheral circuit. The peripheral circuit can include a page buffer coupled to the memory array, a VFC circuit coupled to the page buffer, and a control circuit coupled to the VFC circuit. The page buffer can be configured to detect fail-bits in the memory array. The VFC circuit can be configured to generate an offset signal to compensate a mismatch in the VFC circuit, such that the VFC circuit outputs a quantity of the fail-bits in the memory array. The control circuit can be configured to control an adjustment of the offset signal.

In some embodiments, the VFC circuit can further be configured to adjust the offset signal according to the mismatch.

In some embodiments, the VFC circuit can include a comparator unit configured to determine the mismatch.

In some embodiments, the VFC circuit can further include a trimming unit coupled to the comparator unit and configured to provide the offset signal according to the mismatch.

In some embodiments, the VFC circuit can further include a processing unit coupled to the trimming unit and the comparator unit and configured to output the quantity of the fail-bits by combining the offset signal and an input signal representing the detected fail-bits.

In some embodiments, the input signal can include a plurality of current signals, each representing a detection of a fail-bit.

In some embodiments, the processing unit can further be configured to output a voltage signal having an amplitude proportional to the quantity of the fail-bits.

In some embodiments, the control circuit can further be configured to provide a calibration signal, and the comparator unit is further configured to determine the mismatch by comparing the calibration signal and an output signal of the processing unit.

In some embodiments, the trimming unit can further be configured to decrease the offset signal if the mismatch is positive and increase the offset signal if the difference is negative.

In some embodiments, the offset signal can be decreased or interested by a constant value corresponding to changing the quantity of the fail-bits by 1.

In some embodiments, a memory system can include a memory controller and one or more memory devices controlled by the memory controller. Each of the one or more memory devices can include a memory array and a peripheral circuit. The peripheral circuit can include a page buffer coupled to the memory array, a VFC circuit coupled to the page buffer, and a control circuit coupled to the VFC circuit. The page buffer can be configured to detect fail-bits in the memory array. The VFC circuit can be configured to generate an offset signal to compensate a mismatch in the VFC circuit, such that the VFC circuit outputs a quantity of the fail-bits in the memory array. The control circuit can be configured to control an adjustment of the offset signal.

In some embodiments, the VFC circuit can further be configured to adjust the offset signal according to the mismatch.

In some embodiments, the VFC circuit can include a comparator unit configured to determine the mismatch.

In some embodiments, the VFC circuit can further include a trimming unit coupled to the comparator unit and configured to provide the offset signal according to the mismatch.

In some embodiments, the VFC circuit can further include a processing unit coupled to the trimming unit and the comparator unit and configured to output the quantity of the fail-bits by combining the offset signal and an input signal representing the detected fail-bits.

In some embodiments, the input signal can include a plurality of current signals, each representing a detection of a fail-bit.

In some embodiments, the processing unit can further be configured to output a voltage signal having an amplitude proportional to the quantity of the fail-bits.

In some embodiments, the control circuit can further be configured to provide a calibration signal, and the comparator unit is further configured to determine the mismatch by comparing the calibration signal and an output signal of the processing unit.

In some embodiments, the trimming unit can further be configured to decrease the offset signal if the mismatch is positive and increase the offset signal if the difference is negative.

In some embodiments, the offset signal can be decreased or interested by a constant value corresponding to changing the quantity of the fail-bits by 1.

In some embodiments, a method can include detecting fail-bits in a memory array of a memory device by a page buffer coupled to the memory array, generating an offset signal by a VFC circuit coupled to the page buffer to compensate a mismatch in the VFC circuit, adjusting the offset signal according to the mismatch under the control of a control circuit coupled to the VFC circuit, and providing a quantity of the fail-bits of the memory array by the VFC circuit.

In some embodiments, adjusting the offset signal can include adjusting the offset signal by the VFC circuit.

In some embodiments, the method can further include determining the mismatch by a comparator unit of the VFC circuit.

In some embodiments, generating the offset signal can include providing the offset signal by a trimming unit of the VFC circuit.

In some embodiments, the method can further include receiving, by the VFC circuit, an input signal comprising a plurality of current signals, each representing a detection of a fail-bit.

In some embodiments, the method can further include combining the offset signal and the input signal by a processing unit of the VFC circuit to provide an output signal representing the quantity of the fail-bits.

In some embodiments, providing the quantity of the fail-bits can include providing a voltage signal having an amplitude proportional to the quantity of the fail-bits.

In some embodiments, the method can further include receiving a calibration signal by the VFC circuit, and comparing the calibration signal and the output signal to determine the mismatch.

In some embodiments, adjusting the offset signal can include increasing the offset signal by a constant value if the mismatch is negative, and decreasing the offset signal by the constant value if the mismatch is positive.

In some embodiments, the constant value can correspond to changing the quantity of fail-bits by 1.

In some embodiments, the method can further include comparing the quantity of fail-bits and a baseline quantity corresponding to a quality standard.

The present also discloses a memory device, including a memory array and a peripheral circuit. The peripheral circuit includes a page buffer coupled to the memory array and configured to detected fail-bits in the memory array, a VFC circuit coupled to the page buffer and configured to output a quantity of fail-bits in the memory array, and a control circuit coupled to the VFC circuit and configured to control an operational state of the VFC circuit. Under a calibration mode of the VFC circuit, an offset of the VFC circuit is adjusted to compensate an internal mismatch of the VFC circuit.

In some embodiments, the VFC circuit for counting a quantity of fail-bits in a memory array can include a processing unit and a circuit coupled to the processing unit. The processing unit can receive a first signal representing a number of detected fail-bits in the memory array, process the first signal and an offset signal, and generate a second signal representing a quantity of fail-bits. The circuit can receive the first and second signals, determine a difference between the quantity of fail-bits represented by the second signal and the number of detected fail-bits represented by the first signal, adjust the offset signal according to the difference, and provide the offset signal to the processing unit.

In some embodiments, the circuit can include a comparator unit, and a trimming unit coupled each other. When the operation state of the VFC circuit is in a calibration mode, the comparator unit can determine the difference between the quantity of fail-bits and the number of detected fail-bits, and the trimming unit can adjust the offset signal according to the difference.

In some embodiments, when the calibration mode is on, the trimming unit can decrease an amplitude of the offset value by a constant value if the difference is positive, increase the amplitude of the offset value by the constant value if the difference is negative, and switch off the calibration mode if the difference equals 0. The constant value can correspond to changing the quantity of fail-bits by 1.

In some embodiments, the first signal can include a plurality of current signals, each representing a detection of a fail-bit. In some embodiments, the second signal can include a voltage signal. In some embodiments, the voltage signal can be proportional to the quantity of fail-bits.

The present also discloses a memory system, which includes a memory controller and one or more memory devices controlled by the memory controller. Each of the one or more memory devices includes a memory array and a peripheral circuit. The peripheral circuit includes a page buffer coupled to the memory array and configured to detected fail-bits in the memory array, a VFC circuit coupled to the page buffer and configured to output a quantity of fail-bits in the memory array, and a control circuit coupled to the VFC circuit and configured to control an operational state of the VFC circuit. Under a calibration mode of the VFC circuit, an offset of the VFC circuit is adjusted to compensate an internal mismatch of the VFC circuit.

In some embodiments, the control circuit can provide a calibration signal corresponding to a calibration number. The VFC circuit can be switched on/off a calibration mode by the control circuit. When the calibration mode is off, the VFC circuit can receive the first signal and process the first signal together with an offset signal to generate a second signal corresponding to a quantity of fail-bits in the memory array. When the calibration mode is on, the VFC circuit can receive the calibration signal, process the calibration signal and the offset signal and generate the second signal, and adjust the offset signal to eliminate a difference between the quantity of fail-bits and the calibration number.

In some embodiments, the VFC circuit can include a switch, a comparator unit, and a trimming unit coupled each other. The switch can control an operational state of the calibration mode. When the calibration mode is on, the comparator unit can receive the calibration signal and the second signal and determine the difference between the quantity of fail-bits and the number of detected fail-bits, and the trimming unit can adjust the offset signal according to the difference.

In some embodiments, when the calibration mode is on, the trimming unit can decrease an amplitude of the offset value by a constant value if the difference is positive, increase the amplitude of the offset value by the constant value if the difference is negative, and switch off the calibration mode if the difference equals 0. The constant value can correspond to changing the quantity of fail-bits by 1.

In some embodiments, the first signal can include a plurality of current signals, each representing a detection of a fail-bit. In some embodiments, the second signal can include a voltage signal. In some embodiments, the voltage signal can be proportional to the quantity of fail-bits.

The present also discloses a memory control method, which is used to control the memory to automatically adjust the offset in the VFC circuit. The VFC circuit can be coupled to a page buffer and a control unit of a memory device, and can count a quantity of fail-bits in a memory array of the memory device. The VFC circuit is set in a calibration mode. The calibration mode can be turned on by a switch controlled by the control unit. A calibration signal can be sent to the VFC circuit. The calibration signal can be an analog signal (e.g., an analog current or voltage signal). The calibration signal can have an amplitude corresponding to a calibration number. The calibration signal, together with an offset signal, can be processed by a processing unit of the VFC circuit. The offset signal can be generated by the VFC circuit in order to compensate a mismatch of the processing unit. The calibration number and the output number can be compared by sending the calibration signal and the output signal to a comparator. According to the value of the difference, the calibration operation can proceed in three different directions, until the output number matches the calibration number, that is close the calibration mode when the difference is zero.

In some embodiments, a method can include turning on a calibration mode of a VFC circuit of a memory device, providing the VFC circuit a calibration signal corresponding to a calibration number, processing the calibration signal and an offset signal by the VFC circuit to generate an output signal corresponding to a quantity of fail-bits in the memory array, adjusting the offset signal to eliminate a difference between the quantity of fail-bits and the calibration number, and turning off the calibration mode of the VFC circuit.

In some embodiments, adjusting the offset signal can include changing an amplitude of the offset signal by a constant value. The constant value can correspond to changing the quantity of fail-bits by 1.

In some embodiments, changing the amplitude of the offset signal can include (a) comparing the quantity of fail-bits and the calibration number, (b) increasing the amplitude of the offset signal by the constant value, if the difference between the quantity of fail-bits and the calibration number is negative, (c) decreasing the amplitude of the offset signal by the constant value, if the difference between the quantity of fail-bits and the calibration number is positive, and (d) repeating (a)-(c) until the quantity of fail-bits and the calibration number are the same.

In some embodiments, the calibration signal can include a plurality of current signals. In some embodiments, the output signal comprises a voltage signal. In some embodiments, the output signal has an amplitude proportional to the quantity of fail-bits in the memory array.

In some embodiments, the method can further include counting the quantity of fail-bits in the memory array using the VFC circuit. In some embodiments, the method can further include comparing the quantity of fail-bits counted by the VFC circuit and a baseline quantity. The baseline quantity can correspond to a quality standard.

The foregoing description of the specific embodiments will so fully reveal the general nature of the present disclosure that others can, by applying knowledge within the skill of the art, readily modify and/or adapt, for various applications, such specific embodiments, without undue experimentation, and without departing from the general concept of the present disclosure. Therefore, such adaptations and modifications are intended to be within the meaning and range of equivalents of the disclosed embodiments, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections can set forth one or more but not all exemplary embodiments of the present disclosure as contemplated by the inventor(s), and thus, are not intended to limit the present disclosure and the appended claims in any way. The breadth and scope of the present disclosure should not be limited by any of the above-described exemplary embodiments, but should be defined only in accordance with the following claims and their equivalents.

What is claimed is:

1. A memory device, comprising:
   a memory array; and
   a peripheral circuit, comprising:
   a page buffer coupled to the memory array and configured to detect fail-bits in the memory array;
   a verify fail-bit count (VFC) circuit coupled to the page buffer, wherein the VFC circuit includes a comparator unit configured to determine a mismatch and a trimming unit configured to generate an offset signal to compensate the mismatch in the VFC circuit such that the VFC circuit outputs a quantity of the fail-bits in the memory array, wherein the trimming unit is further configured to:
   decrease the offset signal, if the mismatch is positive; and
   increase the offset signal, if the mismatch is negative; and
   a control circuit coupled to the VFC circuit and configured to control an adjustment of the offset signal.

2. The memory device of claim 1, wherein the VFC circuit is further configured to adjust the offset signal according to the mismatch.

3. The memory device of claim 1, wherein the VFC circuit further comprises a processing unit coupled to the trimming unit and the comparator unit and configured to output the quantity of the fail-bits by combining the offset signal and an input signal representing the detected fail-bits.

4. The memory device of claim 3, wherein:
   the control circuit is further configured to provide a calibration signal; and
   the comparator unit is further configured to determine the mismatch by comparing the calibration signal and an output signal of the processing unit.

5. The memory device of claim 1, wherein the offset signal is decreased or increased by a constant value corresponding to changing the quantity of the fail-bits by 1.

6. A memory system, comprising:
   a memory controller; and
   one or more memory devices controlled by the memory controller, wherein each of the one or more memory devices comprises:
   a memory array; and
   a peripheral circuit, comprising:
   a page buffer coupled to the memory array and configured to detect fail-bits in the memory array;
   a verify fail-bit count (VFC) circuit coupled to the page buffer, wherein the VFC circuit includes a comparator unit configured to determine a mismatch and a trimming unit configured to generate an offset signal to compensate the mismatch in the VFC circuit such that the VFC circuit outputs a quantity of the fail-bits in the memory array, wherein the trimming unit is further configured to:
   decrease the offset signal, if the mismatch is positive; and
   increase the offset signal, if the mismatch is negative; and a control circuit coupled to the VFC circuit and configured to control an adjustment of the offset signal.

7. The memory system of claim 6, wherein the VFC circuit is further configured to adjust the offset signal according to the mismatch.

8. The memory system of claim 7, wherein the offset signal is decreased or increased by a constant value corresponding to changing the quantity of the fail-bits by 1.

9. The memory system of claim 6, wherein the VFC circuit further comprises a processing unit coupled to the trimming unit and the comparator unit and configured to output the quantity of the fail-bits by combining the offset signal and an input signal representing the detected fail-bits.

10. The memory system of claim 9, wherein:
the control circuit is further configured to provide a calibration signal; and
the comparator unit is further configured to determine the mismatch by comparing the calibration signal and an output signal of the processing unit.

11. A method, comprising:
detecting fail-bits in a memory array of a memory device by a page buffer coupled to the memory array;
generating an offset signal, by a verify fail-bit count (VFC) circuit coupled to the page buffer, to compensate a mismatch in the VFC circuit;
adjusting, under a control of a control circuit coupled to the VFC circuit, the offset signal according to the mismatch, wherein adjusting the offset signal further includes:
increasing the offset signal by a constant value, if the mismatch is negative; and
decreasing the offset signal by the constant value, if the mismatch is positive; and
providing, by the VFC circuit, a quantity of the fail-bits of the memory array.

12. The method of claim 11, further comprising determining the mismatch by a comparator unit of the VFC circuit.

13. The method of claim 11, wherein generating the offset signal comprises providing the offset signal by a trimming unit of the VFC circuit.

14. The method of claim 11, further comprising receiving, by the VFC circuit, an input signal comprising a plurality of current signals, each representing a detection of a fail-bit.

15. The method of claim 11, wherein providing the quantity of the fail-bits comprises providing a voltage signal having an amplitude proportional to the quantity of the fail-bits.

16. The method of claim 11, further comprising comparing the quantity of fail-bits and a baseline quantity corresponding to a quality standard.

17. The method of claim 11, further comprising outputting, under a control of a trimming unit and a comparator unit of a VFC circuit, the quantity of the fail-bits, the quantity of fail-bits calculated by combining the offset signal and an input signal representing the detected fail-bits.

18. The method of claim 17, further comprising providing a calibration signal.

19. The method of claim 18, further comprising determining the mismatch by comparing the calibration signal and an output signal of a processing unit, the processing unit coupled to the trimming unit and the comparator unit of the VFC circuit.

20. The method of claim 11, further comprising decreasing or increasing by the constant value the offset signal by the constant value corresponding to changing the quantity of the fail-bits by 1.

* * * * *